(12) United States Patent
Barnes et al.

(10) Patent No.: US 9,032,312 B2
(45) Date of Patent: May 12, 2015

(54) PLATFORM FOR GENERATING COMPOSITE APPLICATIONS

(75) Inventors: Andrew Barnes, O'Fallon, MO (US); Gregg Hill, Lake Saint Louis, MO (US); Joe Busateri, Lake Saint Louis, MO (US)

(73) Assignee: MasterCard International Incorporated, Purchase, NY (US)

( * ) Notice: Subject to any disclaimer, the term of this patent is extended or adjusted under 35 U.S.C. 154(b) by 1191 days.

(21) Appl. No.: 12/335,142

(22) Filed: Dec. 15, 2008

(65) Prior Publication Data

US 2010/0153865 A1 Jun. 17, 2010

(51) Int. Cl.
*G06F 3/00* (2006.01)
*G06F 9/44* (2006.01)

(52) U.S. Cl.
CPC .................................. *G06F 9/4443* (2013.01)

(58) Field of Classification Search
CPC .............. G06F 8/76; G06F 8/38; G06F 3/048
USPC ......... 715/762, 764, 765, 763, 780, 742, 738; 717/107
See application file for complete search history.

(56) References Cited

U.S. PATENT DOCUMENTS

| | | | |
|---|---|---|---|
| 7,734,560 B2* | 6/2010 | Seeger et al. .................... 706/48 |
| 7,774,744 B2* | 8/2010 | Moore et al. .................. 717/104 |
| 7,954,115 B2* | 5/2011 | Gisolfi .......................... 719/320 |
| 8,327,322 B2* | 12/2012 | Auriemma et al. ........... 717/107 |
| 2007/0016615 A1* | 1/2007 | Mohan et al. .............. 707/104.1 |
| 2008/0016516 A1* | 1/2008 | Brunswig et al. ............. 719/315 |
| 2008/0126537 A1* | 5/2008 | Engehausen et al. ......... 709/224 |
| 2008/0229280 A1* | 9/2008 | Stienhans ...................... 717/107 |
| 2008/0307385 A1* | 12/2008 | Dreiling et al. ............... 717/108 |
| 2009/0037871 A1* | 2/2009 | Blum et al. .................... 717/101 |
| 2009/0150443 A1* | 6/2009 | Wiley ......................... 707/104.1 |
| 2009/0150902 A1* | 6/2009 | Gisolfi .......................... 719/311 |
| 2009/0172635 A1* | 7/2009 | Auriemma et al. ........... 717/107 |

* cited by examiner

*Primary Examiner* — Daeho Song
(74) *Attorney, Agent, or Firm* — Hoffmann & Baron, LLP

(57) ABSTRACT

Embodiments of the present invention are directed to composite applications that can be created and implemented using components of a platform disclosed herein. Widgets associated with one or more products available in a mashup container can be implemented based on a selection by a user of the widgets from a widget catalog. A behavior of, and an interaction between, the widgets can be defined using metadata data associated with the widgets without requiring assistance from the user. A skin can be applied to the composite application that controls a visual presentation of the application on a display.

14 Claims, 20 Drawing Sheets

PLATFORM FOR GENERATING COMPOSITE APPLICATIONS

BACKGROUND

Online banking and account management, as well as online shopping applications, are becoming increasingly pervasive. Many banking institutions or merchants offer websites for these activities, which allow end-users to access their bank accounts and records and to purchase merchandise online. In addition, these institutions typically attempt to add value to their websites by providing value added services to end users, which can entice the end users with offers, promotions, features, services, loan and credit applications, and the like (referred to herein as "products"). Banking institutions and/or merchants can engage another financial institution having a payment system/network to provide such added value. In some cases, these financial institutions can develop customized applications to be used by partner banking institutions and/or merchants. The applications are generally web-based applications that can be hosted by the financial institution and are implemented on the financial institutions servers.

These customized application solutions for the banking institutions and/or merchants can be burdensome and expensive to develop and are generally an inefficient use of resources. What is desired is a platform from which composite applications can be developed by assembling and customizing products within parameters defined by the financial institution and without requiring the user to develop code for the individual applications that form the composite application or code that defines an appearance, interaction, and behavior of the composite application.

SUMMARY OF THE INVENTION

Embodiments of the present invention are directed to composite applications that can be created and/or implemented. Widgets associated with one or more products available in a mashup container are implemented based on a selection by a user of the widgets from a widget catalog. The behavior of, and an interaction between, the widgets is defined using metadata associated with the widgets without requiring assistance from the user. A skin is applied to the composite application that controls a visual presentation of the application on a display.

In some embodiments, the widgets selected by the user and configuration metadata associated with a position at which one or more of the widgets are to be depicted on the display can be retrieved from a configuration repository. The widgets can be loaded into the mashup container at runtime based on the configuration metadata and the configuration metadata can be interpreted at runtime when widgets are being loaded into the environment using a composite application assembler. The one or more widgets can be graphically depicted at the appropriate position with a widget layout generator.

In some embodiments, layout specification and configuration metadata specific to the user is retrieved from a configuration repository. The layout specification metadata can correspond to a layout of the widgets. The widgets can be loaded into the mashup container at runtime based on the role of the user using the composite application assembler. The layout specification metadata can be interpreted by the layout generator at runtime when widgets are being loaded into the environment. The one or more widgets can be graphically depicted at the appropriate position.

In some embodiments, a first one of the widgets can be incompatible with a second one of the widgets and the first one of the widgets can be connected with the second one of the widgets. Events associated with the first one of the widgets can be translated into a form compatible with the second one of the widgets by a widget event mediator. Rules involving interactions between the first one of the widgets and the second one of the widgets for transfer of the events between the first one of the widgets and the second one of the widgets can be applied by the widget event mediator so that the first one of the widgets is unaware of the second one of the widgets.

In some embodiments, a first one of the widgets that produces data can be queried for a type of data being exchanged by a widget data exchange framework. A list of active widgets can be built from the widgets in the mashup container. Widget metadata can be retrieved from the widget catalog for the active widgets and it can be determined whether a first one of the widgets from the list of active widgets is a data consumer of the type of data being exchanged. The first one of the widgets can be added to a list of possible actions and the list of possible actions can be displayed to the user.

In some embodiments, one or more widgets that are dependent on the service provider interface (SPI) of the mashup container can be implemented within a third party container with a widget adapter, and an adapter that converts between the SPI of the mashup container and the SPI or the third party container can be provided.

In some embodiments, a list of available external destination containers can be built, where a first one of the widgets is capable of being implemented in a destination container associated with the list. A selection of the destination container from the list is received and a widget publisher is located from widget metadata. A correct widget adapter from the widget metadata is located. The first one of the widgets with the located adapter is encapsulated and added to the destination container using the widget publisher.

The preferred embodiments of the present invention, as well as other objects, features and advantages of the present invention will be apparent from the following detailed description, which is to be read in conjunction with the accompanying drawings. The scope of the invention will be pointed out in the claims.

DETAILED DESCRIPTION

Embodiments of the present invention are based on a convergence of Web 2.0 and Service Oriented Architecture (SOA) to provide an Enterprise 2.0 platform (hereinafter "platform"). A "platform", as used herein, refers to a group of components and frameworks from which application environments are formed, where the application environments can use some or all of the components or frameworks available in the platform. Applications built upon the platform, or that interface therewith, can leverage many capabilities and concepts of Web 2.0 and SOA.

The platform supports multiple delivery channels, such as Web 2.0 rich user interfaces, mashups, portlets, mobile Wireless Application Protocol (WAP), Short Message Service (SMS), and Really Simple Syndication (RSS), and it provides the ability to skin and reconfigure components for a given delivery channel. Web 2.0 concepts, such as collective intelligence like ranking or tagging, as well as perpetual betas for real time user feedback, can be supported by the platform. The platform can facilitate integration between products (both functionality and look-and-feel). Individual products can implement a set of backend domain business services that support delivery channels. In addition, the platform provides common (infrastructure) services and components that can be shared between products. Besides service based integration, the platform also supports the ability to integrate products at the user interface level by enabling the creation of composite applications that integrate graphical components and services from existing products. Products include offers, promotions, features, services, loan and credit applications, and the like, but could be any application that provides functionality over the web. A "composite application", as used herein, refers to a software solution that is created by integrating multiple independent, domain specific applications into a unified experience.

Figure 1:
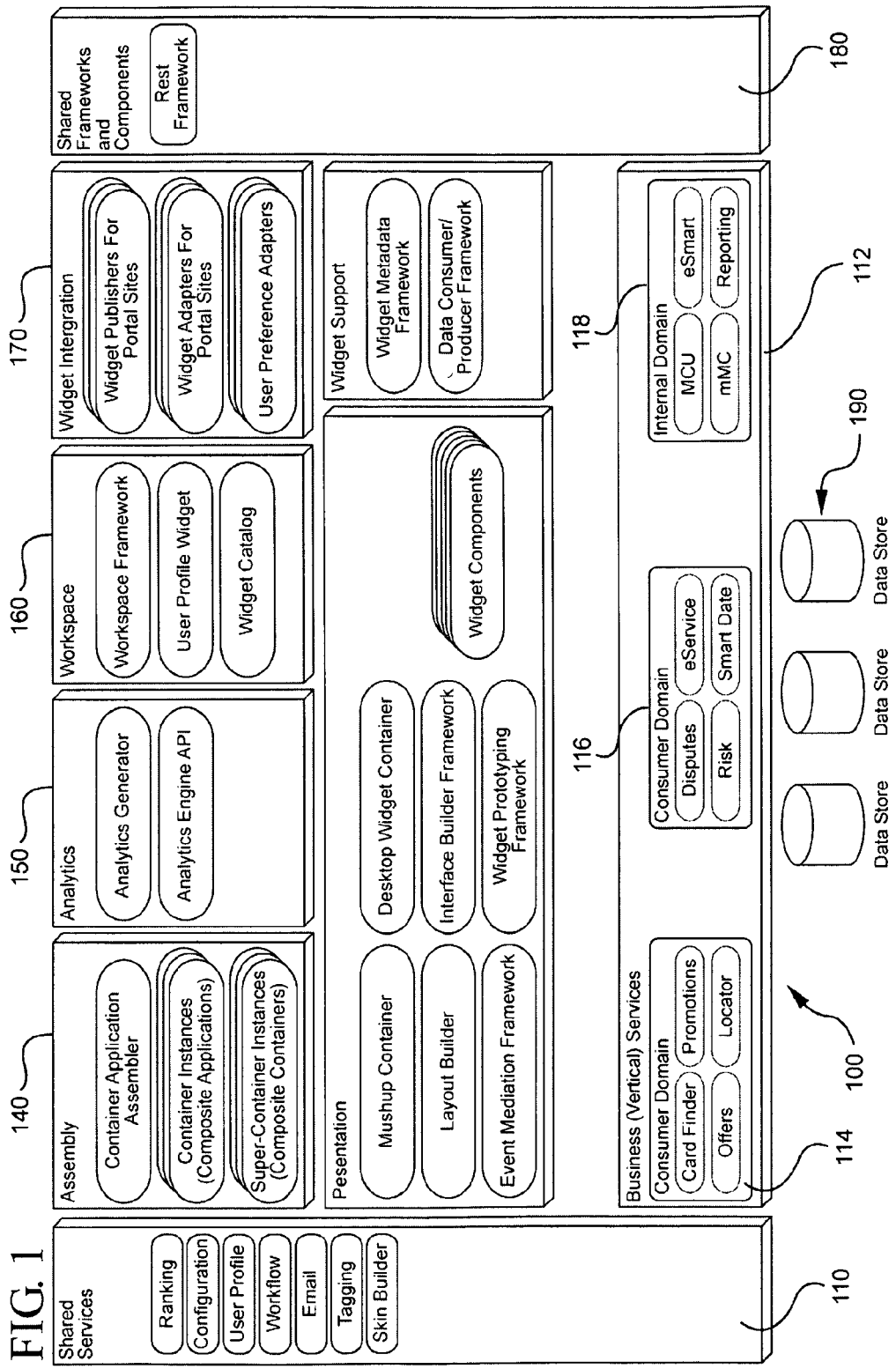
FIG. 1 is a block diagram that shows a logical structure and components of a platform for generating composite applications.

FIG. 1 is a block diagram of the enterprise platform 100 (hereinafter "platform 100"). Components of the platform 100 are illustrated as subdivided functional units of concern, where each functional unit groups together realizations of enterprise business/solution patterns, discussed in more detail below. Some of these realizations can take the form of functional components or frameworks. The platform 100 includes a shared services unit 110, a presentation unit 120, a widget support unit 130, an assembly unit 140, an analytics unit 150, a workspace unit 160, a widget integration unit 170, and a shared frameworks and components unit 180.

Shared services 110 are instances of horizontal services that provide capabilities to functional components of the platform 100, as well as applications making use of the platform 100. These applications can be made up of one or more widgets. Widgets are software generated instances that include functional aspects and can represent generally self contained applications that can be implemented independently or as part of a larger application. Widgets can be implemented to provide a user facing perspective on the shared services and can be stored in storage 190 along with metadata associated with the widgets. Metadata is information that describes the information about the widgets and can be used to affect a behavior, function, interaction, depiction, positioning, and the like, of a widget.

Shared services can be broken into three categories. A first category corresponds to capabilities that are generic to any application, such as email, workflow management, and the like. A second category corresponds to Web 2.0 capabilities, such as collective intelligence in the form of ranking, tagging, and the like. A third category corresponds to implementations of some functional components of the platform 100, such as centralized configuration, dynamic presentation skin building capabilities, and the like.

Vertical (or domain) services 112 can be implemented to provide business functionality that is specific to each domain, such as a consumer domain 114, a customer domain 116, and an intra-enterprise domain 118. The vertical services 112 can implemented based on the end-user of a composite application to be developed. The vertical services 112 can provide specific functionality directed to the domain that may have no relevance or meaning outside of the domain, such as an ATM locator for consumers, a risk analyzer for the customer (e.g., a banking institution, merchant, vendor, etc), and a report generator for within the enterprise.

The presentation functional unit 120 can provide the ability to create dynamic, rich, composite applications by mashing together graphical widget components from multiple domain specific applications. As such, the presentation functional unit 120 provides implementations of enterprise business patterns that facilitate these capabilities. One capability in the presentation unit 120 is a mashup container, which provides an environment in which other functional components, such as widgets, can operate.

The widget support unit 130 provides the ability for widgets to interoperate in a loosely, operatively coupled manner. The widget support unit 130 also provides the ability for components of the presentation unit 120 to discover capabilities and metadata for a given widget so that the widget support unit 130 can operate independently without knowledge of the widget's specific parameters.

The assembly unit 140 builds integrated composite applications by assembling widgets from standalone applications and provides implementations of enterprise business patterns that facilitate performing application assembly with minimal development work.

The analytics unit 150 is responsible for automating capture and generation of web analytics. Applications focus on what events are of analytic interest and the functional components provided handle the mechanics of capturing the necessary information, relieving applications from focusing on other details.

The workspace unit 160 provides a workspace metaphor on top of base presentation components. The framework and components that belong to this unit provide a windowing environment, user profile, and a catalog (toolbox) of embeddable widgets. The user workspace unit 160 can be used to implement a web desktop. A web desktop is a desktop environment embedded in a web browser or similar client application. Web desktops provide an environment similar to that of Windows, Mac, or a graphical user interface.

The widget integration unit 170 can provide support for integrating environment-based widgets into common third party widget aggregation platforms, such as iGoogle from Google™, myYahoo from Yahoo!®, and the like. The widget integration unit 170 also handles seamless access to user preferences across these platforms, so that widgets can customize their behavior based on user preferences identified in the third party widget aggregation platforms, if such preferences exist and are available. As used herein, "behavior" refers to the way the widgets respond to input data, user actions, events, preferences, and the like.

Shared frameworks and components 180 are instances of the foundational components and frameworks described herein. These frameworks and components provide capabilities to functional components of the platform 100, as well as applications making use of the platform 100. Shared frameworks and components 180 can be broken into two categories. A first category can be for capabilities that are generic to any application like internationalization support and a second category can be for Web 2.0 capabilities, such as the Representation State Transfer (REST) framework used to provide lightweight services.

Figure 2:
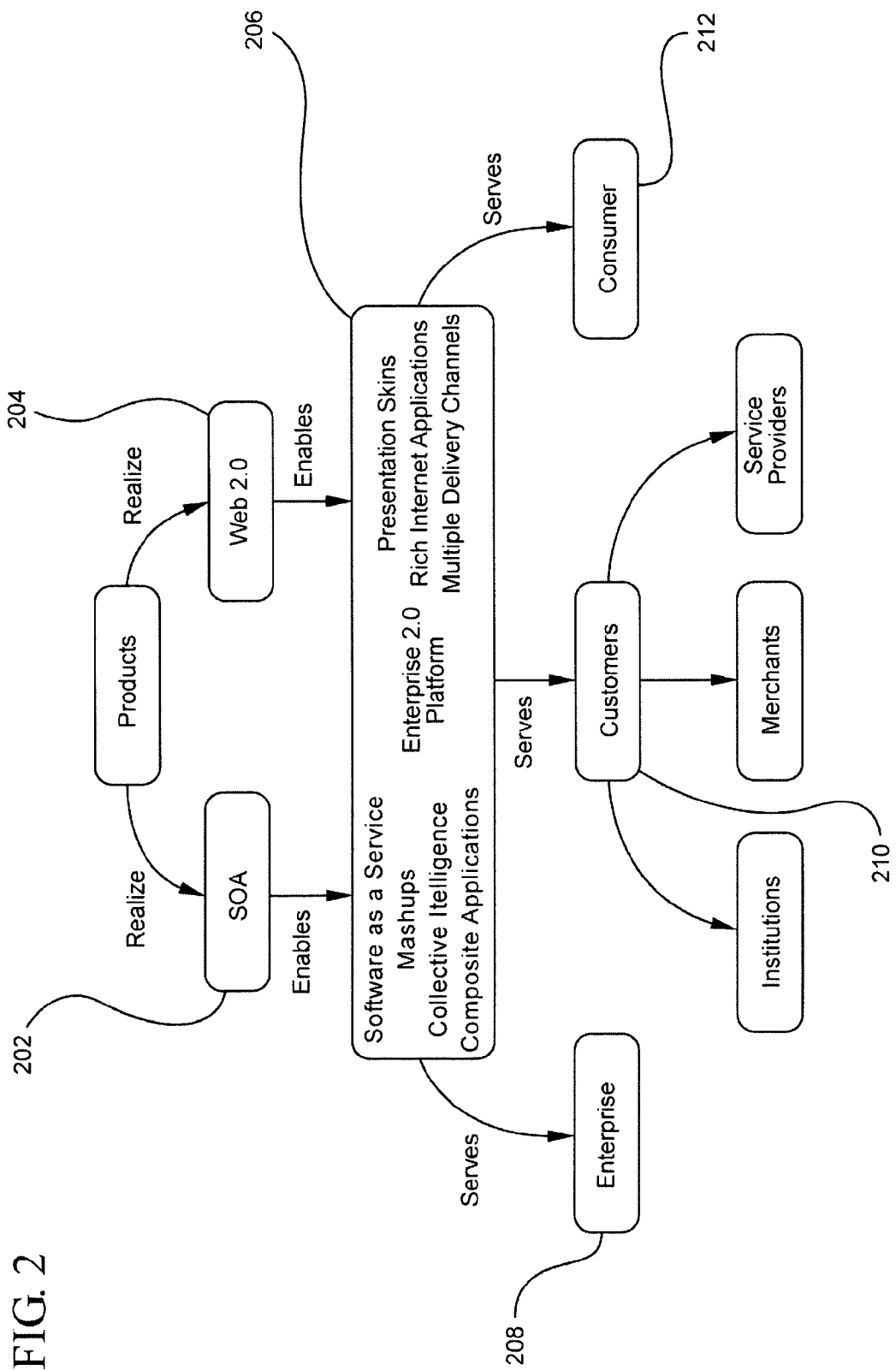
FIG. 2 shows the overall context of the platform of FIG. 1 as it relates to the rest of its environment.

FIG. 2 shows the overall context of the platform as it relates to the rest of its environment Products that serve consumers, customers, and the like, can realize service oriented architecture (202) and Web 2.0 (204) concepts. Realization of these concepts enables the Enterprise 2.0 platform (206) to provide its documented functionality. This platform subsequently serves the enterprise (208), customers (210), and consumers (212), but can serve any target user segment that fits the bounds of the problems it is built to address.

Figure 3:
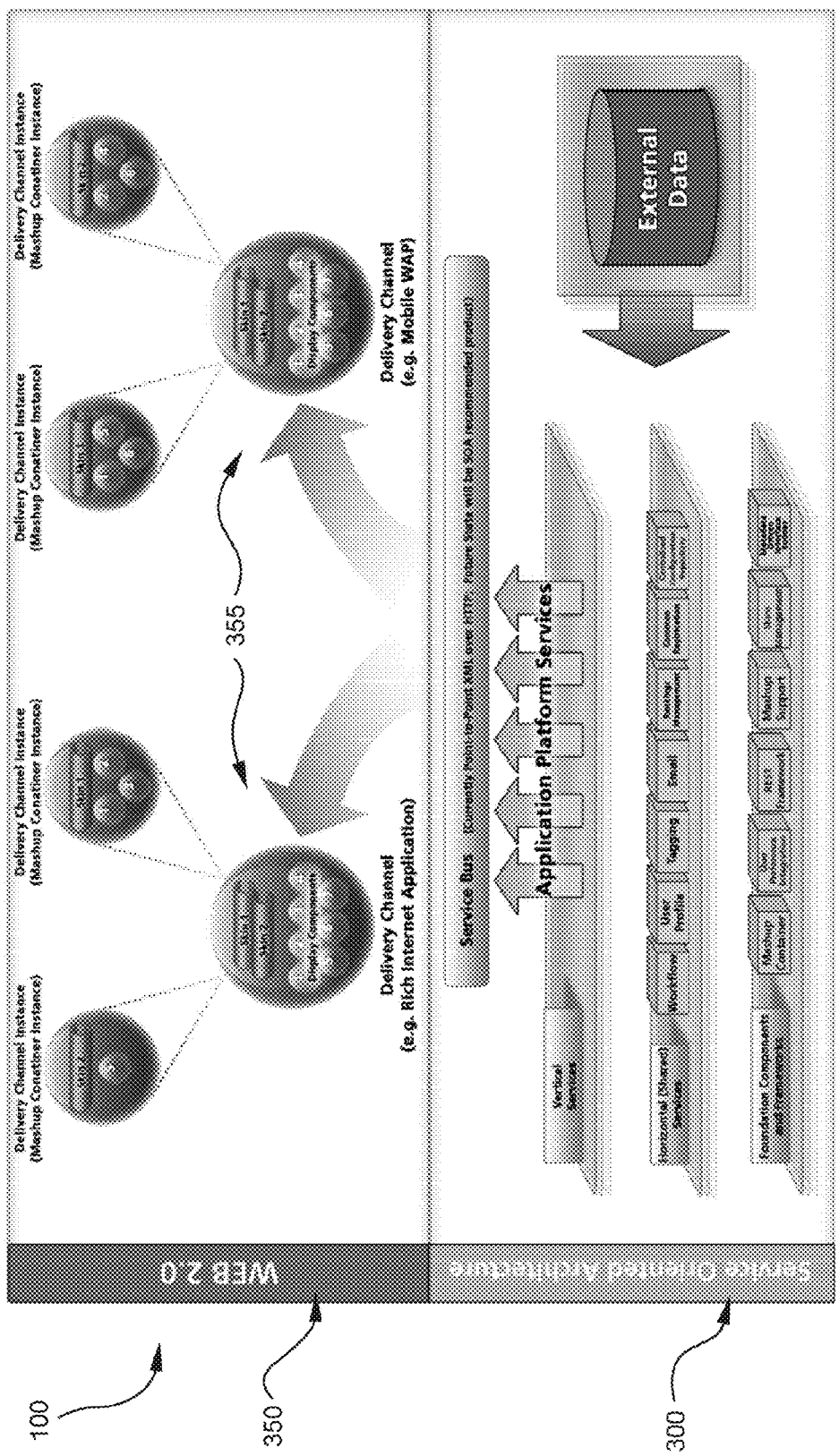
FIG. 3 shows the overall architectural layering and structural perspective of the platform of FIG. 1.

FIG. 3 shows the overall architectural layering and structural perspective of the platform and applications based upon it (100). It provides a high level view of the functional components within each layer, including a service based business tier 300 and a Web 2.0 based presentation tier 350 that provide the underlying services used by applications built using components of the platform 100.

The business tier (backend) 300 is preferably based on Service Oriented Architecture (SOA) architectural patterns having at least two distinct types of services including the horizontal (or shared) services, which are not specific to a given business domain and are used across all applications, and the vertical (or domain) services that are specific to each domain, such as a consumer domain, a customer domain, and an internal domain. The benefit of standards based services on the backend 300 is that the services can be integrated with multiple delivery channels 355 of the front end 350.

The presentation tier (front end) 350 is preferably based on Web 2.0 concepts, one of which is multiple delivery channels 355 for software, including Web-based rich user interface, mobile mashups, Really Simple Syndication (RSS), etc. To accommodate this, the platform 100 provides for multiple delivery channels 355 that consume the same business tier 300 services, yet contain sets of components that present functionality in ways specific to their respective delivery channels 355. Furthermore, the channels 355 can be configured at runtime via external parameters, presentation skins, component selections/layouts, and the like. This allows the delivery channels 355 to adapt to a specific environment, such as a mashup within another site, yet maintain a common base set of components.

Figure 4A:
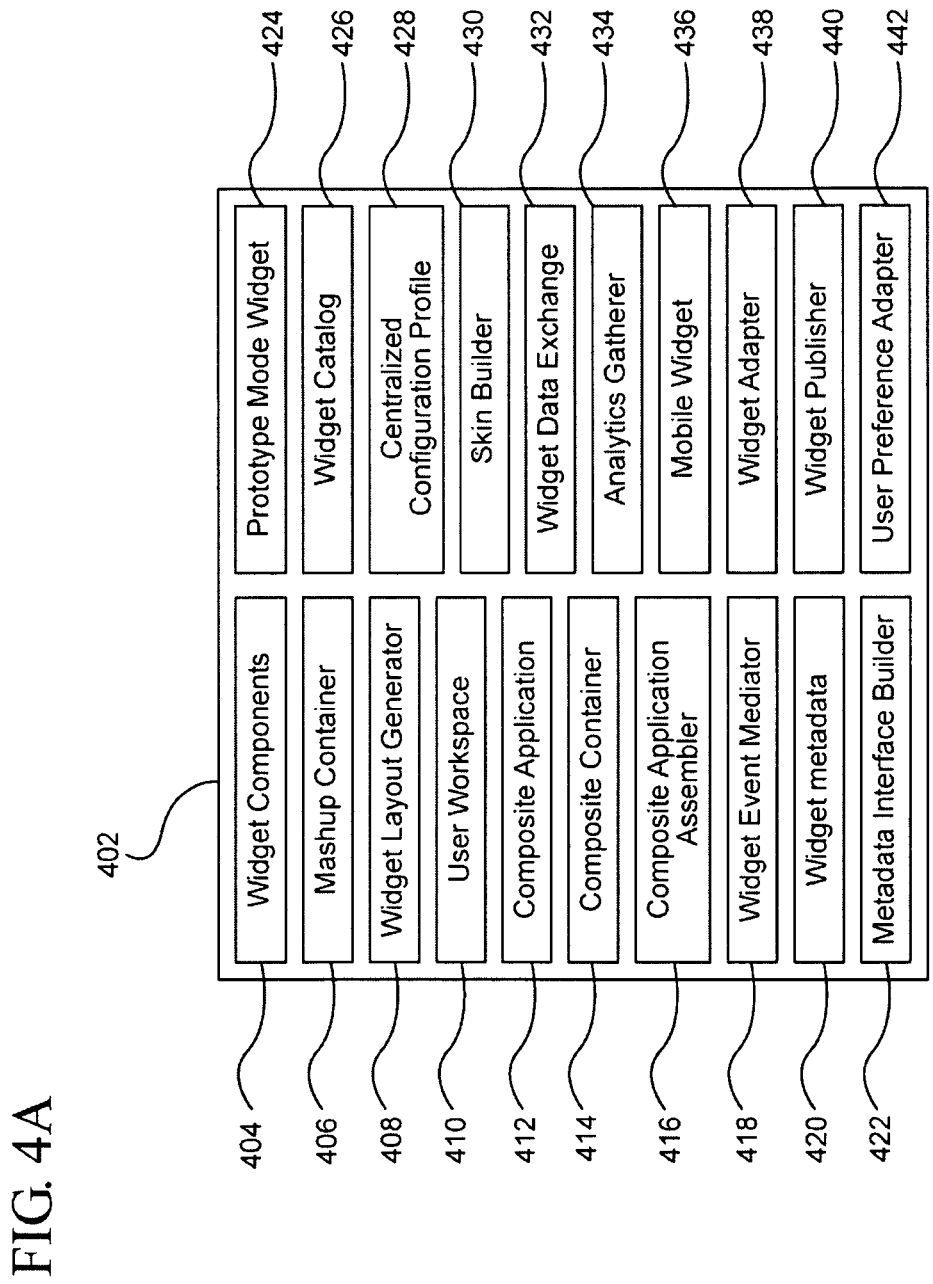
FIG. 4A shows a set of enterprise business patterns that describe the platform and that govern aspects of the platform of FIG. 1.
Figure 4B:
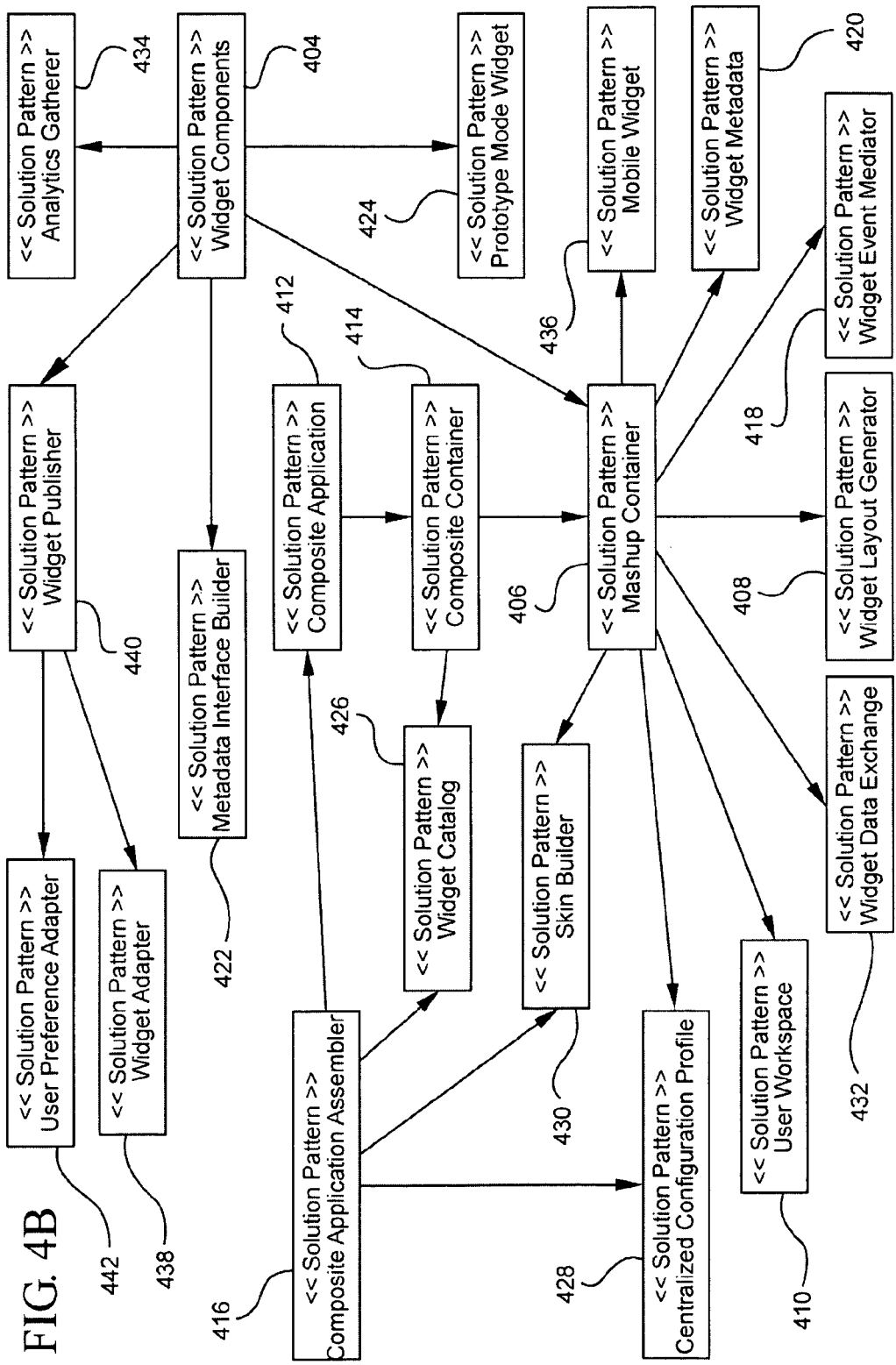
FIG. 4B is a block diagram showing relationships between the patterns of FIG. 4A.

FIG. 4A shows a set of enterprise business patterns 400 that can be used to concisely describe the various aspects of the platform 100 and FIG. 4B is a block diagram showing a relationship between the patterns. As used herein, "business patterns" and "solution patterns" are higher order software patterns that make use of multiple lower level patterns (design patterns, architectural patterns, etc). An enterprise business pattern is composed of a set of interacting solution patterns, which in turn encompass the lower level patterns. Enterprise business and solution patterns can include software implementations that can be repeatedly used to make or to generate components or parts of components. The patterns can provide a template for component development that can be used in developing one or more components or parts thereof.

A pattern language describes a set of patterns and how they interact. The platform 100 is composed of a single composite application business pattern 402 that is the topmost, overarching pattern in a layer of patterns. This topmost pattern is divided into a group of solution patterns, which are described herein, and can include a widget component 404, a mash-up container 406, a widget layout generator 408, a user workspace 410, a composite application 412, a composite container 414, a composite application assembler 416, a widget event mediator 418, a widget metadata facility 420, a metadata interface builder 422, a prototype mode widget 424, a widget catalog 426, a centralized configuration repository 428, a skin builder 430, a widget data exchange facility 432, an analytic gatherer 434, a mobile widget 436, a widget adapter 438, a widget publisher 440, and a user preferences adapter 442. These solution patterns trace to functional components in the logical/functional perspective of the architecture.

Instances of the widget components 404 (hereinafter "widgets 404") are a standalone presentation components, which provide an interface to a single, focused piece of user-facing functionality. Widgets 404 are composite in that they can themselves be composed of a set of more granular widgets 404. At the lowest level, widgets 404 are comprised of primitive user interaction elements such as input fields, buttons, and text. At the highest level, they realize entire use cases from an application domain, such as an ATM locator, credit application form, and the like.

Widgets 404 are standalone in that they require no explicit dependencies on other widgets 404 to function. This capability allows widgets to be composed into applications with no development work, since they make no assumptions about the presence of other widgets in their environment. To accomplish this loose coupling, widgets use events to communicate. When an action of interest occurs in a given widget, the widget broadcasts an event describing this action to the rest of the widgets in the environment. Any other widget that must perform some corresponding action based on the event listens for occurrences of the event and reacts accordingly. A compelling side effect of this style of interaction is that widgets can be replaced with no effects on the rest of the system, provided the replacement widgets publish and consume the same events. Interaction between widgets refers to how a widget responds to input data received from another widget, to an event published by a widget, and the like.

Widgets 404 can be deployed directly using the runtimes of the associated technologies they are developed with (e.g., a Flash player for Flex based widgets or a web page/browser for Ajax based widgets), or they can be deployed in the mashup container 406 to gain an extra level of widget management capabilities.

An advantage of capturing software use cases as widgets 404 is that they can be easily deployed in many environments, such as on third party web sites and widget based portals, instead of only a single centrally hosted site. This decentralized deployment allows the widget provider to take advantage of the additional user traffic generated by these environments. To support efficient and simple integration, widgets have the ability to be embedded into a host site using a single line of code. This is accomplished with a proxy that is deployed and hosted centrally for each widget to create a level of indirection. The single line of code to embed a widget references the proxy, which then performs the work to embed it in the target.

Instances of the mashup container 406 provide an environment that widgets 404 can be place in and that widgets 404 can operate within. Instances of the mashup container 406 facilitate loose coupling between widgets 404 and widget lifecycle management, in addition to providing common capabilities used by widgets 404. An application can simply be an instance of the mashup container with a particular set of widgets configured. By providing components that work within an instance of the mashup container 406, applications can ensure that their functionality can be composed with widgets provided by other applications within the instance of the mashup container 406. The mashup container 406 exposes a service provider interface (SPI) that widgets designed to run within the container depend on. Provided that a widget operates within the bounds of the container SPI, it can run within an instance of the mashup container.

Instances of the mashup container 406 can work with skin builder 430 to provide the skins that the mashup container 406 applies to contained widgets at runtime. Skins are the visual effects given to widgets to control the overall look and feel of the presentation, ensuring a consistent user experience across multiple applications that provide widgets. Instances of the mashup container 406 can work with the widget layout generator 408 to perform dynamic creation and layout of widgets based on configuration information. The mashup container 406 also provides other services to widgets, such as localization support and inter-widget communication via a centralized event channel.

Instances of the mashup container 406 can exist for each type of environment that widgets will run within. For example, web browser based mashup containers can host widgets on the web, whereas native operating system application based mashup containers can host widgets on the desktop. Regardless of the instance of the mashup container 406 being run, the widgets themselves have no knowledge of the type of host container and work seamlessly across any container that implements the service provider interface expected by the widget.

The composite application assembler 416 works in conjunction with the mashup container 406 to provide loading of widget components for a particular container instance based on external information. The widget layout generator 408 works in conjunction with the mashup container 406 to provide layout of widget components for a particular container instance based on external information. This allows for the specification of widget component mashups and layout without the necessity for programming. The layout is specified using layout specification metadata, which can be stored externally and interpreted at runtime to allow for completely dynamic reconfiguration of widgets and their layouts. The composite application assembler 416 and widget layout generator 408 can utilize multiple strategies for deciding which widgets to display in the container and the size/layout of those widgets.

In a predefined layout strategy, layout metadata is specified to the widget layout generator 408 and composite application assembler 416 at startup, which identifies the widgets and their positions. The layout string is stored externally, so multiple layouts and sets of widgets can be created, and the correct one chosen at runtime based on the context of the request.

In a user role layout strategy, where the user and their role information are known, the widget layout generator 408 and composite application assembler 416 can build a set of widgets based on what is appropriate for the user's role. When used within the user workspace 410, this strategy also takes into account the user's preferences when performing the layout, such as the last size and position of each widget when the user last used the application. To find the set of widgets appropriate for a given user role, the strategy makes use of widget metadata 420.

The user workspace 410 adds a desktop metaphor to the mashup container 406, which can provide a web desktop. The user workspace 410 is itself a container that nests inside of an outer mashup container (e.g., an instance of the composite container 414). When widgets 404 are added to the user workspace 410, the user workspace 410 decorates the widgets with window-like capabilities, such as a border, title bar, minimize/maximize buttons, and the like. It also operates in an interactive mode with the user, allowing them to move and resize the windows decorating widgets 404 in the container. Individual widgets that are embedded in a user workspace composite container have no knowledge of the existence of this container, and operate in the same way whether they are in a user workspace container or a more general mashup container.

The user workspace 410 applies user preferences by making use of a centralized configuration profile 428 for storage and retrieval. Preferences include any widgets a user has added to their workspace from the widget catalog 426, as well as a current configuration of the user workspace 410, such as size and position of each widget. The latter property implies that the user workspace 410 provides the ability to generate a representation of the current layout that can be stored in the profile based on the size and position of the widgets currently in the user workspace 410. Furthermore, upon re-entry, the user workspace applies the previously stored layout representation to restore the last workspace state, using the widget layout generator 408.

The composite application 412 is assembled from pieces of existing applications. Using SOA based services on the backend can facilitate integration at this level to form a composite application by making service-to-service invocations. In this model, a single high level service that is responsible for the functionality required by the composite solution interacts with a set of lower level services that implement discrete pieces of functionality that contribute to the overall solution. This type of composition is behind the scenes and transparent to the user for scenarios involving processing with minimal user interaction, such as in batch or asynchronous processing scenarios.

A widget based composite application can include a mashup container 406 that is configured with a set of widgets, from potentially a variety of applications that together provide the functionality required by the composite solution. These widgets can be standalone, or may themselves be a container with more granular widgets, in which case the mashup container 406 for the composite application acts as the composite container 414. Some composite applications may be complex enough that behavior specific to the interactions of the widgets that make up the solution are provided. These widget interactions and their corresponding behavior represent domain rules of the composite application. In such cases a widget event mediator 418 is used to provide these rules independently of the individual widgets.

The composite container 414 is a mashup container that is composed of one or more embedded mashup containers. These embedded containers may in turn consist of additional levels of nested mashup containers. The embedded containers can act as widgets from the perspective of the composite container, and the composite container can act as a super-container to the embedded containers. This capability allows arbitrarily complex solutions to be composed from sets of widgets, where some of the widgets are further composed from lower level widgets.

Since some compositions are themselves containers, the compositions can be reused outside of an enclosing composite container as a standalone mashup container. This allows solutions to be used independently and/or as a building block of a larger solution.

Mashup containers can have awareness of whether they are a top level container, or are embedded inside of a composite container, and can react accordingly by behaving as a widget to the service provider interface of the composite container. In some embodiments, individual application widgets running in the containers may not have any awareness of container composition.

The composite application assembler 416 can operate in a design time and/or run time mode. In design time mode, it provides the ability for administrative users to interact with it to assemble a composite application be selecting widgets, layout, skins, and event mediations and in turn generating the necessary composite application metadata. In run time mode, it coordinates the assembly of the necessary widgets into a running mashup container to build a composite application using composite application metadata (either generated in design time mode or using another strategy such as role based metadata).

In design mode, the composite application assembler 416 can provide a user friendly interface for building of composite applications by assembling widgets into a mashup container. It may not provide the composite application support itself, but instead may delegate to the widget catalog 426, composite container 414, widget layout generator 408, widget event mediator 418, widget metadata 420, skin builder 430, and centralized configuration profile 428. Instead, the composite application assembler 416 can provide a centralized, graphical means of specifying metadata to the components that do provide the composite application support. While the configuration metadata for these components can be specified manually, the composite application assembler 416 can provide a customer self service layer over the low level configuration details. A user can interact with the composite application assembler 416 and composite application support components.

For example, the user can create a new composite container instance and select widget components from the widget catalog that satisfy a desired function. The user can also lay out selected widget components in the composite container to specify a size and location metadata to the widget layout generator and can select a skin from registered skins in the skin builder, or upload a new skin. The widget components can be wired together by selecting source and target events for each widget component from the widget metadata and specifying event rules to the widget event mediator. Widget component specific configuration values for configuration options stored in the widget metadata can be provided by the user and the composite application assembler stores all composite application metadata to the centralized configuration profile.

The widget event mediator 418 provides a loosely coupled mechanism of wiring disparate and/or incompatible widgets together, translating events between them, and applying rules. The mashup container 406 can allow widgets 404 to function completely independent of each other. However, when widgets 404 are to interact, the widget event mediator 418 facilitates event based communications. Translations and rules involving interactions between widgets can be specified centrally to the event mediation framework using external configuration data, which can keep individual widgets unaware of each other. The widget event mediator 418 listens for events from widgets within the mashup container, and based on the configured rules, forwards appropriate interactions to the target widgets.

In some embodiments, an event brokering model can be used where the mediator 418 is provided with event translation rules and direct event translations. For example, if an event X is received from a widget, and there are rules to translate $\{X \rightarrow Y, Z\}$, the mediator 418 can publish events Y and Z, which can be visible to active widgets in the related mashup container. Event brokering can be recursive, so if events Y or Z have rules defined, the mediator 418 can publish subsequent events based those rules.

In some embodiments, a rule execution model can be used where the event mediator 418 can be provided with business rules that are executed in response to configured events. Such business rules can be used to capture interactions between widgets without the involved widgets having any knowledge of each other. The business rules are provided in a way that makes it simple to update them independently of the widgets, either via a rules engine or pluggable rule implementations that are dynamically loadable.

Widget metadata 420 can provide a standard specification and access model for data that is used to describe a widget component. This data can be used by other components, such as the mashup container and/or composite application assembler to introspect widgets and learn about their capabilities without the need to know the details of any specific widget. Widget metadata 420 reside in the widget catalog 426. The widget provider can register the appropriate widget metadata 420 when registering the widget in the catalog.

Widget metadata 420 can include, but is not limited to events published/consumed by the widget, data that the widget produces or consumes, version information, widget attribute metadata describing customizable properties of the widget, which can be customized by the assembler of an application containing the widget and/or customized by the user of an application containing the widget, locations of widgets in the widget catalog, and the like. The widget metadata access model can provide a high level interface to access and traverse the metadata without the need to understand and process the underlying data format.

The metadata interface builder 422 provides a declarative means for building user interfaces within a widget component. At runtime, the metadata interface builder 422 can automatically create and lay out primitive user interaction elements, such as input fields, buttons, text, and the like, that widgets are made up of at their lowest level. The element creation and layout behavior of the metadata interface builder 422 is driven by externally provided metadata. Thus, the metadata interface builder 422 can act as an interpreter of presentation metadata by processing the input definitions and rendering primitive user interaction elements.

The metadata interface builder 422 can be separated into a core engine and multiple technology-specific rendering engines. The core engine is responsible for processing interface metadata, and directing the appropriate technology-specific rendering engine to draw the appropriate user interface elements. Each technology specific rendering engine can be responsible for receiving commands from the core engine and translating them to the target presentation technology for execution.

The metadata interface builder 422 also provides generic user interface widgets for each targeted presentation technology. The generic user interface widget can be provided a set of presentation metadata, and can invoke the appropriate processing and rendering engines to draw the interface described by the metadata upon its display unit.

Presentation elements that are generated by the metadata interface builder 422 can be configured declaratively by the external interface metadata instead of custom interface programming. This provides the ability to switch primitive user interaction elements via external configuration, provided the semantics of those elements remain the same. For example, a widget component can use the metadata interface builder 422 to render a single choice element as either radio buttons or a dropdown list with no programming changes.

Some applications can provide a generic capability and require business situation-specific data capture. Using the metadata interface builder 422 to build the interface from declarative metadata, it prevents a generic application from having to know anything about the business-specific data. For example, a generic workflow management application could provide a shared, reusable capability. However, unique types of workflows hosted in the application may capture different business-specific data. The data capture requirements can be externalized as metadata, allowing the generic workflow management tool to work with any business scenario.

Using widgets and the mashup container can advantageously enable quick assemble composite applications by combining and configuring existing components. These components can be configured to control the presentation look and feel with a skin, widget selection and layout, and to customize widget specific behavior properties.

An application assembler can have the ability to prototype with the live widgets that make up a solution so that different combinations of these configuration dimensions. Such prototyping can advantageously be performed without the need for the widgets to connect to their back end data sources and so that their full runtime environment available to them.

Prototype mode widgets 424 can be provided to support a prototyping mode, where the prototype mode widgets 424 can display test data and do not attempt to connect to backend data sources or utilize services provided only in the full runtime environment. This capability allows prototyping of composite applications and configurations without the burden of providing the normally required environment and enables third parties to contribute to assembling and customizing composite solutions without the need for a full environment.

The widget catalog 426 is a centralized repository for widgets and widget metadata. This repository can store widget names, locations, metadata, and the like, along with widget binaries. The widget catalog can provide services to retrieve widgets, as well as their metadata, and can provide the ability to serve versioned widgets, so that multiple widget release versions can be stored in and served by the catalog. Consumers can reference dependent widgets from the widget catalog 426 can work uninterrupted while other consumers use later versions of the widgets. Widget component providers can register their widgets and corresponding metadata in the widget catalog 426.

In addition to storage and access services for widgets and their metadata, the widget catalog 426 can provide a widget selection component that is itself a widget. This widget selection component can allow users to view and filter widgets by various criteria, and to drag them to a mashup container in design time mode to embed them therein. This component can be used by the application assembler to specify the widgets that will make up the solution being assembled and can be used by the user workspace to allow end users to add widgets to their own workspace.

An automated widget onboarding process that centers on the widget catalog 426 can be responsible for deploying widgets to the widget catalog 426, updating widget level metadata in the widget catalog 426, and/or updating composite application configuration metadata to reference widget as necessary.

The centralized configuration profile 428 can provide the ability to store configuration metadata that applies to composite applications overall, as well as widget instances within composite applications. The configuration profile can store configurations on a user by user basis, as well as on a composite application instance basis. The configuration profile can provide a single identifier for a set of configuration data, which a composite application instance or user-associated instance can use to uniquely identify and retrieve the associated configuration data on demand.

Application metadata 420 can be broken into a hierarchy consisting of user configurations, composite application configurations, widget group configurations, and widget instance configurations. User configurations can include user information, saved workspace state, user attributes (general) (name-value pairs), user widget attributes (WidgetGroupId.WidgetInstanceId.UserPropertyMetadataName), composite application configuration, and the like. Composite application configurations can include application skin, application attributes (general) (name-value pairs), widget group configurations, and the like. Widget group configurations can include applicable user roles, widget instance configuration (for each group member), and the like. Widget instance configuration can include widget reference (see Widget Metadata), widget attributes (name-value pairs), widget skin, and the like.

The centralized configuration profile 428 can provide a service that consumers can use to add or retrieve configuration data in the profile and can provide an administrative interface where a user can add or update configuration data. The centralized configuration profile 428 can provide a configurable widget that can be added to the set of widgets that form a composite application so that an application can expose configuration capabilities to end users of the composite application in which the widget is embedded, such as in the case of user preferences update feature.

The skin builder 430 can facilitate dynamic generation of presentation skins for applications, where the presentation skins can provide one dimension of composite application configurability focusing on the look and feel of the applications (colors, fonts, basic layouts). Within the skin builder 430, skins can be divided into color, font, and layout concerns and can be stored at that level. This allows the ability to create logical skins that encompass concerns from multiple physical skins concerns. For example, a first logical skin can include the color concern from a second skin and font concern from a third skin. Consuming applications reference logical skins by a unique identifier from the skin builder 430, and at request time, the final skin is desired by combining the individual concerns of which it is composed.

A logical skin can also refer to more than one concern of a specific type. For example, a first logical skin could contain two different font concerns. The skin builder 430 can combine the skin concerns at request time. This capability is advantageous when the introduction of themes is desired. For example, when it is desired to have common look and feel properties across a set of applications. The theme font concern may specify a font type and application specific font concerns could then define other properties such as color, size, etc. Combining the multiple font concerns into a single font concern at request time ensures the theme font is always adhered to, while leaving the individual application open to specify the remaining font properties.

Widget data exchange 432 facilitates a transfer of information between disparate widgets running within a single container and makes use of the widget metadata to allow widgets to publish types of data they are able to produce or consume. The mashup container uses this metadata to dynamically build sources and targets for data that is specified by a user via standard gestures. For example, if a user clicks on a piece of data of type "X" in a particular widget (this widget would be a data producer in this scenario), and then performs a gesture such as a double click on that data item, the container can query the source widget for the type of data being exchanged, in this example type "X"; build a list of all active widgets in the container; retrieve the widget metadata from the widget catalog for active widgets; determine if the widget is a data consumer of the data type being produced by the data producer, in this case type "X"; and if it is, add the widget name to the list of possible actions. When all data consumers have been found, a list of possible actions for the data item that was selected can be displayed.

This approach advantageously decouples widgets from knowing about any other widgets in the container (e.g., each widget only knows that type of data it produces or consumes), and automatically integrates new widgets added to the environment into the model, since the list of targets for a selected data item is built dynamically based on runtime discovery of data producers.

The analytics gatherer 434 can provide the ability for widget components to publish events of analytic interest, which can be captured in a set of web analytics collected for the application that the component is a part of. The analytics gatherer can listen for any analytics events from widgets in the container, and store the associated analytics using an underlying web analytics platform. The analytics gatherer 434 can advantageously separate low level generation and storage of analytic data from the determination of the business activities that are of analytic interest. The analytics gatherer 434 also provides configurable filters that can be used to determine which subset of analytic events are logged to the underlying analytics platform and which are filtered out. The widgets are able to concentrate on determining which user interactions are of analytic value, while the analytics gatherer 434 can concentrate on the details of storing the analytics. In some embodiments, the analytics gatherer 434 is the single pipeline to storage of analytics so that web analytics platform access knowledge is contained in a single place and so that such knowledge can easily be changed without effects on individual widget components.

Mobile widget 436 can provide the support that enables a widget component to be transported between different mashup containers. Containers can exist for each environment that supports running widget components. If a widget supports mobility, it can be moved between instances of any of these containers based on a user gesture. The current context of the widget that is moved also migrates along with it, so that the widget continues to run as-is, and is seamless from the perspective of the user.

The support provided by Mobile Widget includes the ability to capture a current container context of a widget, inject the widget into another container instance, provide a captured source container context to the destination container for the widget, and start the widget running in the destination container.

For example, a user can run a widget in a browser based container, and can move the widget to their desktop container in a passive mode to allow the user to close their browser based container, while allowing the user to continue to interact with the widget.

The widget adapter 438 can provide the ability to run a widget component that is dependent on the mashup container SPI inside of a third party widget/mashup container, such as, for example, iGoogle. The widget adapter 438 provides a widget container SPI compatible interface on the widget side, and a third party mashup container compatible interface on the container side. Available widget adapters can be specified in the metadata for a given widget.

The widget adapter 438 for a particular third party mashup container is referenced and added to the container while the container is in a configuration mode by the widget publisher. At this same time, the widget adapter 438 can be provided an Enterprise 2.0 Platform based widget component to wrap and the adapter 438 can translate between these interfaces.

The widget adapter 438 ensures that Enterprise 2.0 Platform based widgets can be used within externally provided mashup containers when an adapter exists for the particular external container. This advantageously allows customer facing widgets to be integrated directly into portals or containers used by a particular customer and enables the business functionality supported by the widget to be injected directly into a customer business process seamlessly.

The widget publisher 440 works in conjunction with the widget adapter to facilitate publishing an adapted widget component to third party widget/mashup containers. At least one widget publisher 440 exists for each widget adapter 438, and a combination of widget publisher 440 and widget adapter 438 exist for supported third party widget/mashup containers. Available widget publishers can be specified in the metadata for a given widget.

The widget publisher 438 provides a framework with an introspection facility that enables the mashup container to dynamically build a list of available external destination containers to which the widget can be added to. When the user selects a particular destination container from the target list, the framework can locate the correct widget publisher from the widget metadata, locate the correct widget adapter from the widget metadata, wrap the widget to publish with the located adapter, and add the widget to the destination container using the located widget publisher.

The user preference adapter 442 works in conjunction with the widget adapter 438 to provide support to take into account any local user preferences if they are available, and fall back to anonymous user behavior if there are none or if the local user preferences cannot be processed. Preferences can be generic across all widgets or specific to a given widget's business focus.

The mashup container SPI provides the ability to access user preferences if a widget component is running inside of a platform provided container and the user identity is known. For third party containers, a user preference adapter is responsible for mediating between the API provided by the external container to access user preference information and the SPI expected by the widgets in the container. This makes user preference access seamless to widget components in any environment that an adapter is available. Available user preference adapters can be specified in the metadata for a given widget. The widget adapter for the specific third party container can inject the appropriate user preference adapter.

Figure 5:
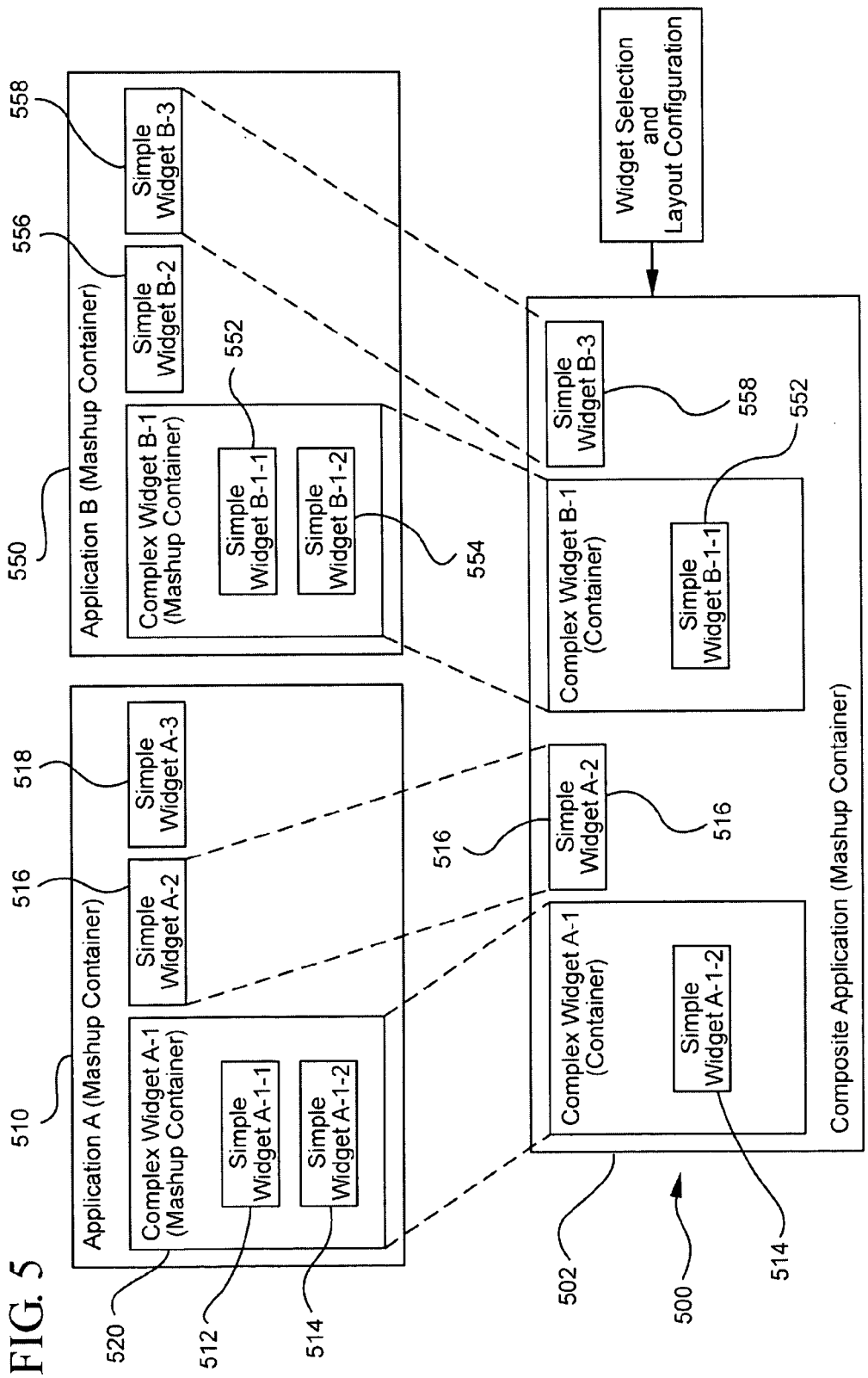
FIG. 5 illustrates how a composite application 500 is assembled using widgets from other applications.

FIG. 5 illustrates how a composite application 500 is assembled using widgets from other applications. The composite application 500 can implemented within a mashup container 502. The composite application 500 can be formed using widgets from an application 510 and an application 550, which themselves may be composite applications. For example, the application 510 can be composed of widgets 512, 514, 516, and 518, where widgets 512 and 514 form a complex widget 520. The widgets 516 and 518 can be independent stand alone applications contained with the application 510. The application 550 can be formed from widgets 552, 554, 556, and 558, where widgets 552 and 554 can form a complex widget 560. The widgets 556 and 558 can be independent stand alone applications contained with the application 550. Widgets 514, 516, 552, and 558 can be selected to form the composite application 500. The environment can implement layout configurations and user preferences on the widgets 514, 516, 552, and 558 to customize the composite application using these widgets.

Figure 6:
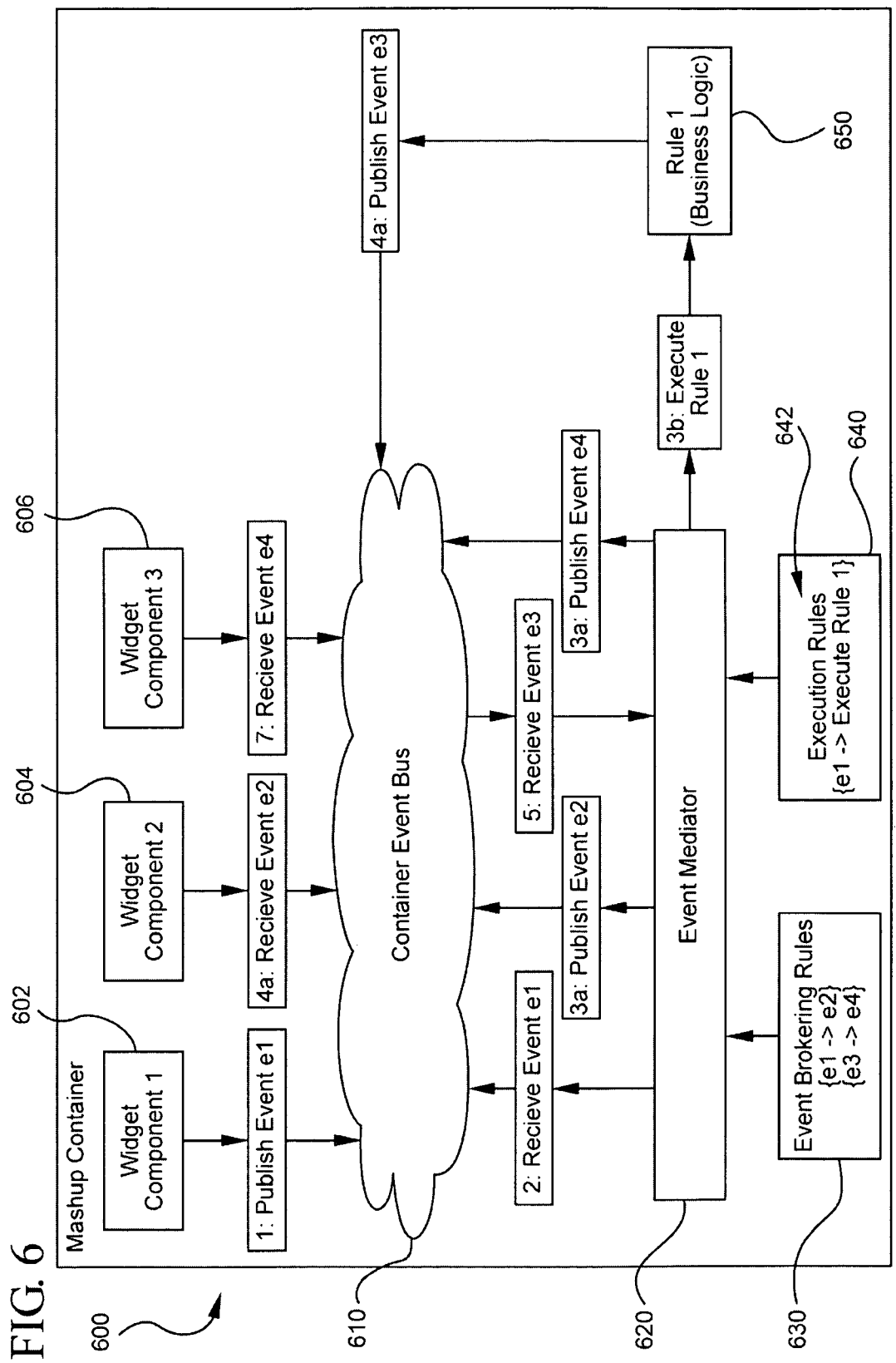
FIG. 6 illustrates an exemplary implementation of a widget event mediator.

FIG. 6 illustrates an exemplary implementation of a widget event mediator. A mashup container instance 600 can include widgets 602, 604, and 606, as well as a container event bus 610, the event mediator 620, event brokering rules 630, execution rules 640, and business logic 650. The widget 602 can publish an event e1 to the container event bus 610, which passes the event e1 to the event mediator. The widgets 604 and 606 may not be able to process the event e1 in its present form. The event mediator 620 processes the event e1 associated with the widget 602 using the event brokering rules 630 and publishes an event e2, which represents a transformed version of event e1 that is compatible with the widget 604 so that the widget 604 can process the event e2, and therefore, the event e1. In addition, upon receipt of event e1 the event mediator 620 can implement execution rules 640 so that a rule 642 is executed using business logic 650. The business logic can process the rule 642 and in response can publish an event e3, which can pass through the container event bus 610 to the event mediator 620, which can apply the event brokering rules 630 to transform the event e3 into an event e4 in form that can be processed by the widget 606.

Figure 7:
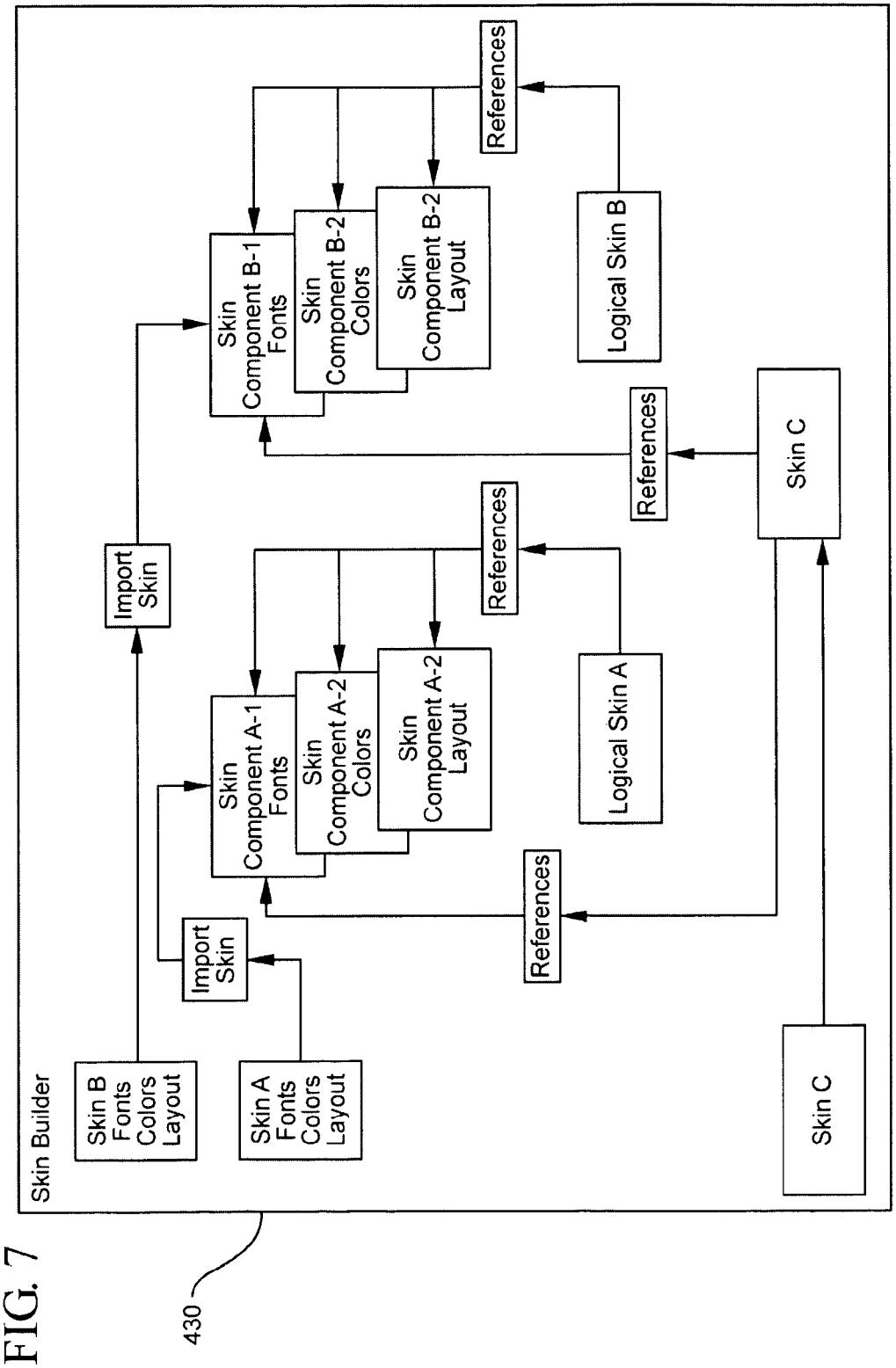
FIG. 7 illustrates an exemplary implementation of a skin builder.
Figure 8:
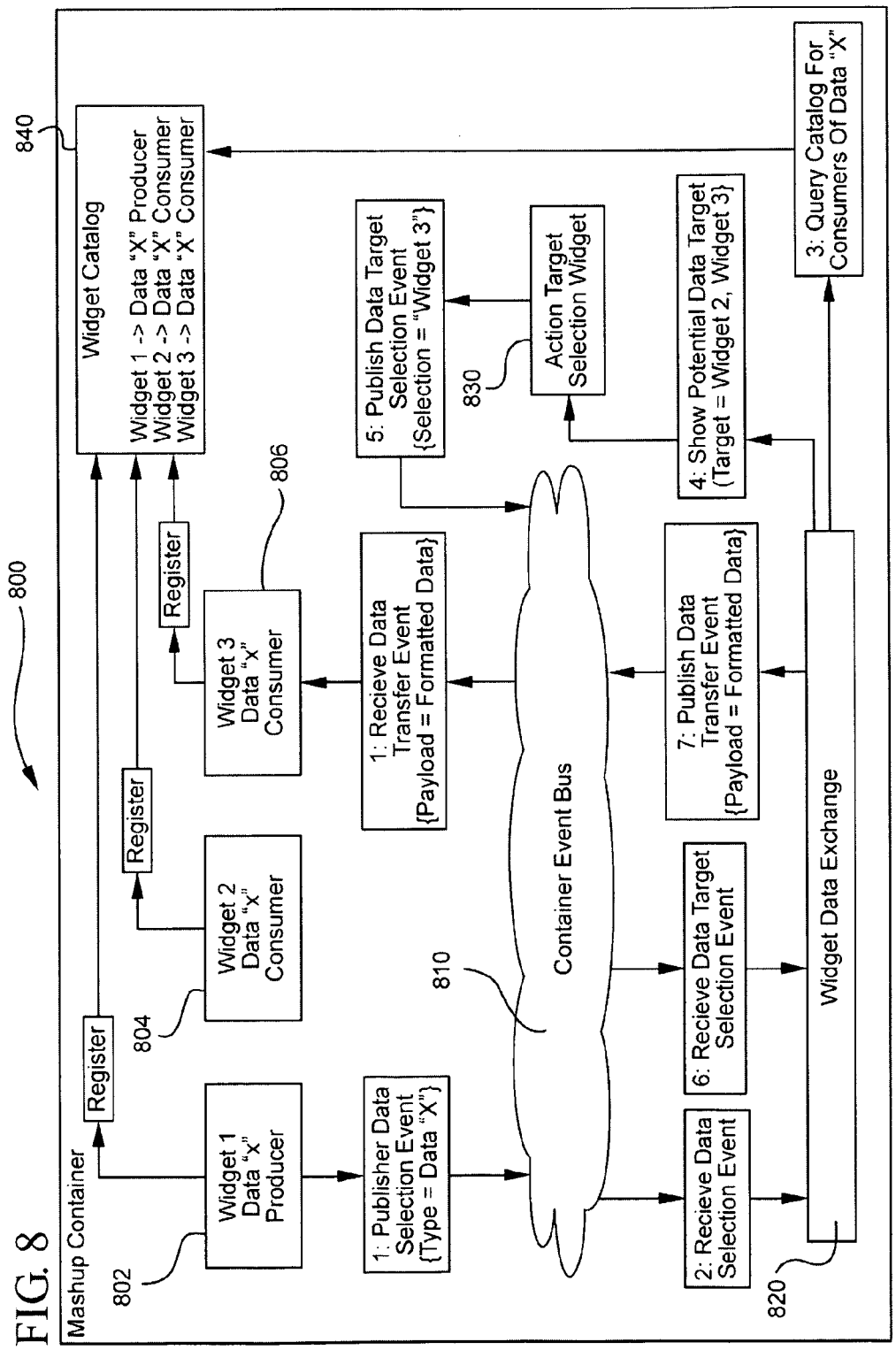
FIG. 8 illustrates an exemplary implementation of a widget data exchange.

FIG. 7 illustrates an exemplary implementation of the skin builder 430. Skins A and B are broken into color, font, and layout concerns and stored at that level. This allows the ability to create logical skins that encompass concerns from multiple physical skins concerns. In the present example, a logical skin C can includes the color concern and layout concern from skin B and font concern from skin A. This enables parts (concerns) of skins to be reused and remixed with other skin concerns into unique logical skins without the need to perform skin development activities FIG. 8 illustrates an exemplary implementation of the widget data exchange. A mashup container instance 800 can include widgets 802, 804, and 806, as well as a container event bus 810, the data exchange 820, and action target selection widget 830, and widget catalog 840. In the present example, if a user selects a data item of type "X" in the widget 802, and then performs a gesture, such as double clicking on the data item with a mouse, the widget 802 is queried for the type of data being exchanged (e.g., type "X") and a list of active widgets 802, 804, and 806 in the mashup container is created. Widget metadata is retrieved from the widget catalog for the widgets 802, 804, and 806, and a determination of whether widgets 804 and 806 are consumers of the data type (e.g., type "X") produced by the widget 802. In this example, the widget 804 is a data consumer of the data type "X", so the name of the widgets 804 is added to the list of possible actions. The list of possible actions for the data item that was selected is therefore displayed based on the runtime discovery of widgets that can receive and process the data. This enables new widgets to be introduced into the environment and be dynamically included into the data exchange mechanism without the requirement of any integration related development activities.

Figure 9:
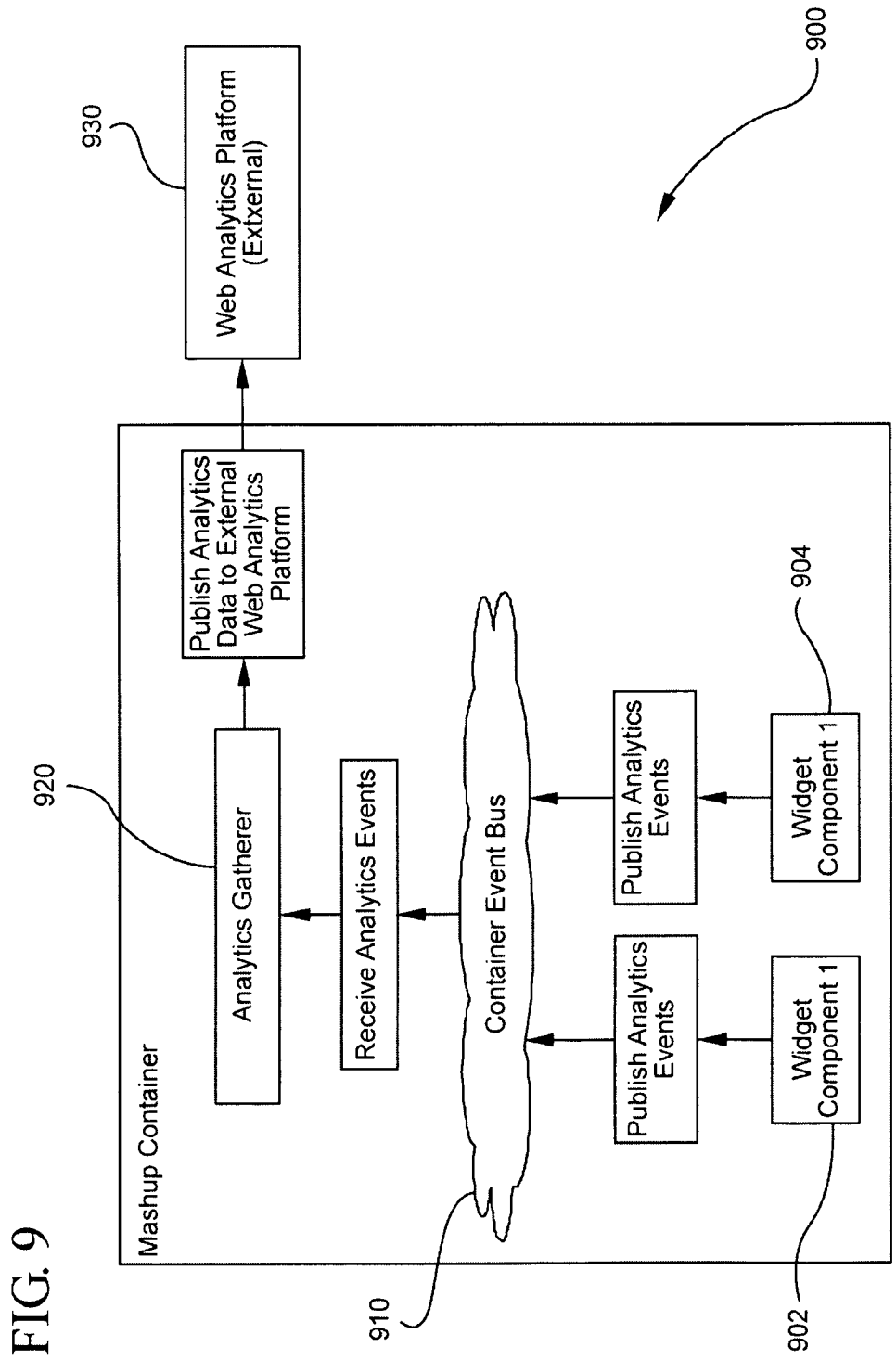
FIG. 9 illustrates an exemplary analytics gatherer.

FIG. 9 illustrates an exemplary analytics gatherer. A mashup container 900 can include widgets 902 and 904, each of which can publish analytic events via a container event bus 910 to the analytic gatherer 920. The analytic events can be processed by the analytic gatherer and can be passed to web analytics software 930, such as Omniture or Hitbox, which can perform analysis and reporting of the activity and/or behavior within the mashup container. The analytics gatherer also supports filtering of analytic events, where only events satisfying the filter are passed to the web analytics software.

Figure 10:
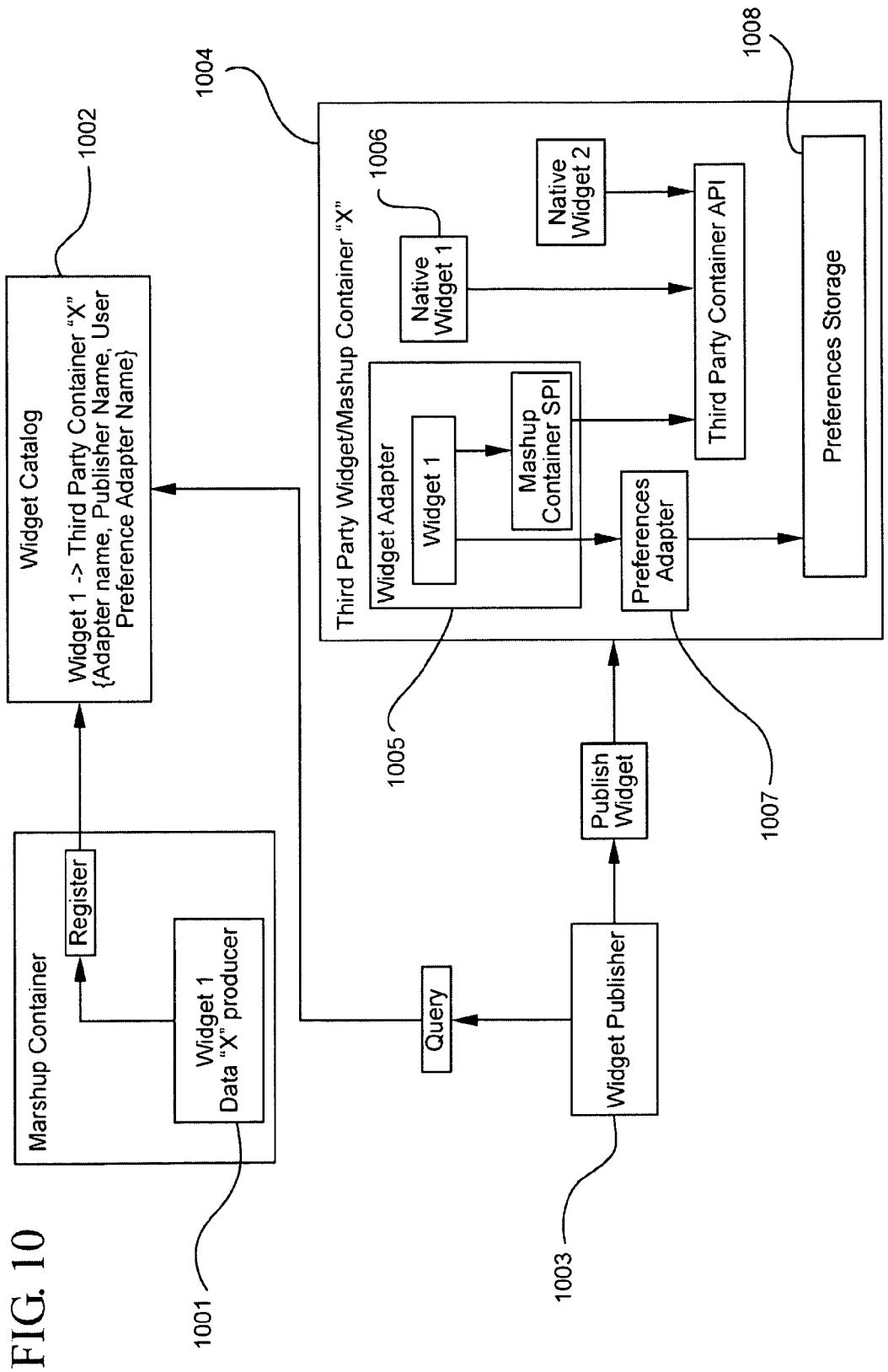
FIG. 10 illustrates an exemplary implementation of a widget adapter.

FIG. 10 illustrates the process of publishing a widget to a third party container using the widget adapter, widget publisher, and user preference configured work together to allow widget components to run in third party container. A widget 1001 is registered with the widget catalog 1002 as part of its regular onboarding process. Part of the metadata added to the widget catalog is the third party containers that it has adapter support for. This metadata includes an adapter name, publisher name, and user preference adapter name. When a user gesture at any time in the future initiates adding a widget to the third party container 1004, a container-specific widget publisher 1003 coordinates the process. It wraps the selected widget with the appropriate container-specific widget adapter 1005, which makes it appear to the third party container 1004 as a native widget 1006. It the third party container supports user identification and preferences, the appropriate preferences adapter 1007 is used to interact with the native preferences storage 1008 of the third party container.

A user, such as, for example, a bank, merchant, or other institution, can create a composite application based the components described above. In some embodiments, the user can create the composite application using an instance of the composite application assembler 416 implemented as a website in a web-based environment. One embodiment of the composite application assembler is depicted in FIGS. 11-15. The components of the platform 100 can be implemented in the background as the user makes selections in the website so that the composite application is being constructed while the user navigates the website. Once the composite application is constructed, it can be published so that others can access and use the composite application. In some embodiments, prior to publishing the composite application, the user must receive approval of the composite application for the provider.

The user can be required to login into the composite application assembler website prior to development of a composite application. For example, the website may require the user to enter user identification (ID), a pin, secure ID, and/or a password. Once the user successfully logs in, the user can be prompted with a "welcome page".

Figure 11:
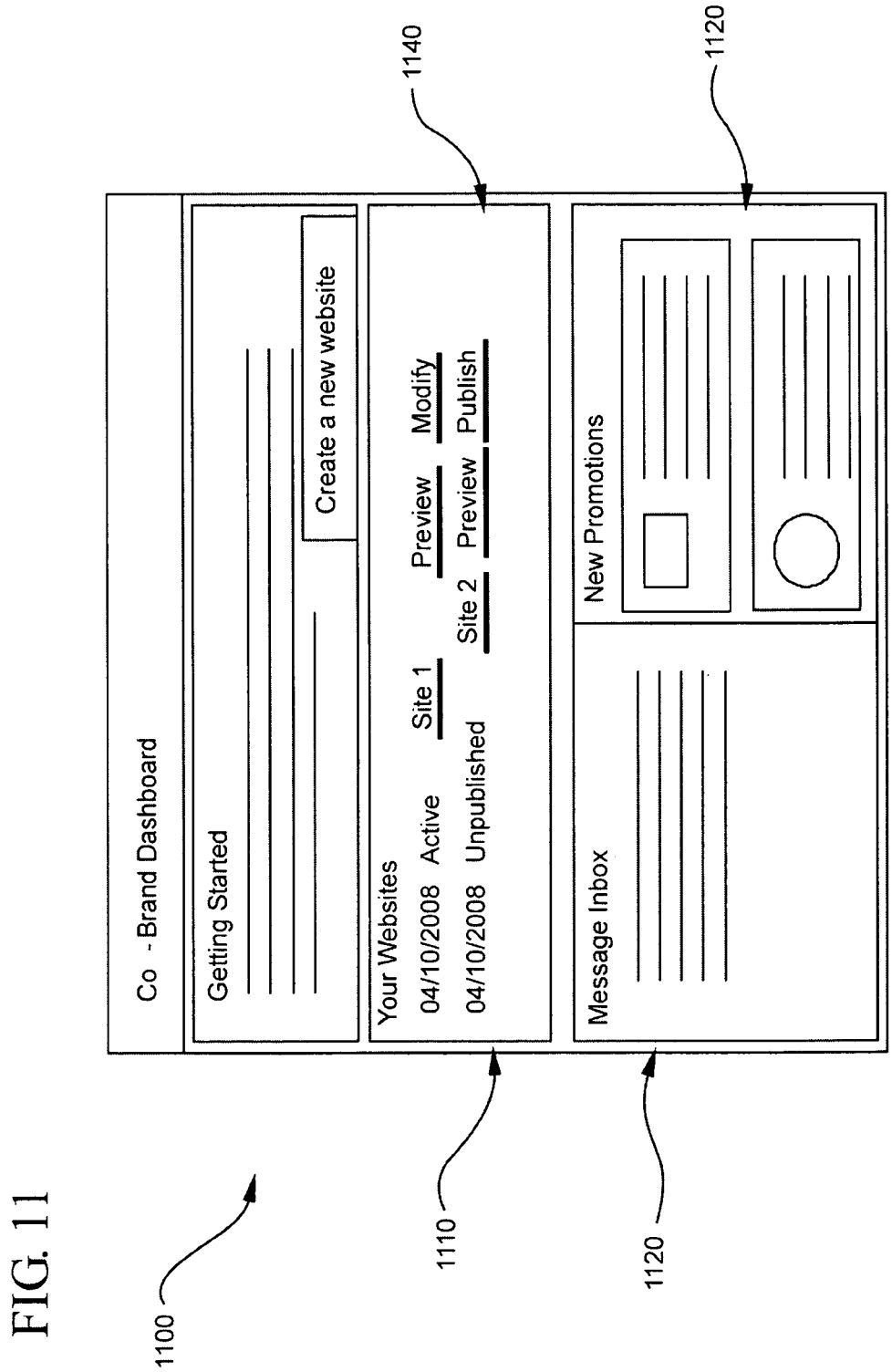
FIGS. 11-15 shows an exemplary embodiment of a composite application assembler in design time mode.
Figure 12:
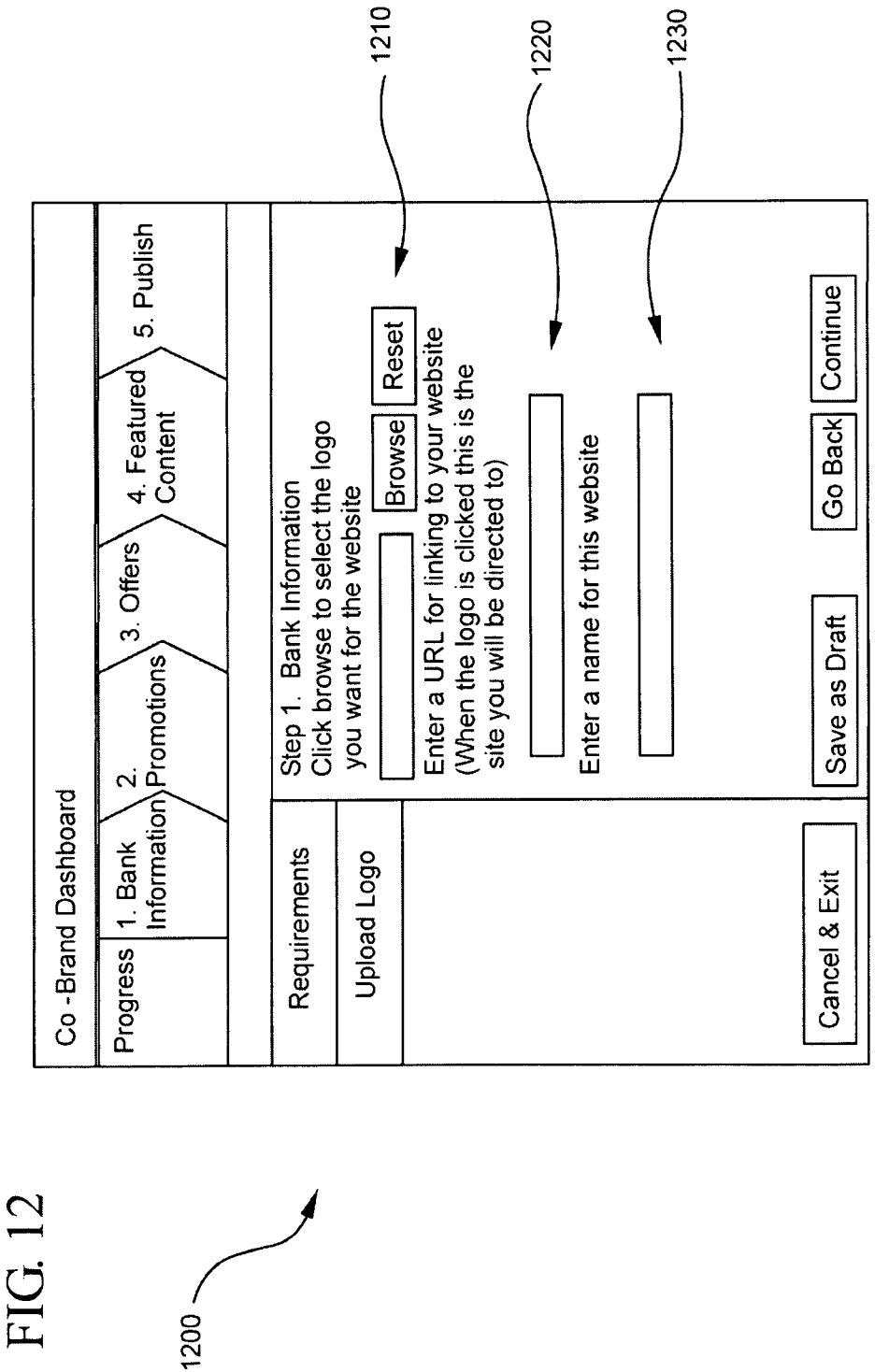

FIG. 11 shows an exemplary welcome page 1100 that can be implemented. The welcome page 1100 can identify composite applications that have previously been created by the user in a "your websites" section 1110. A "notifications" section 1120 can be provided to list messages for the user and a "new promotions" section can be provided to alert the user to new services or products that are available to be incorporated into the user's composite application(s). The welcome page 1100 can also include a "create new website" option 1140, which if selected by the user begins the process of developing a composite application.

When the user selects the "create a new website" option 1140, the environment creates a new mashup container in design mode to be filled with widgets from the widget catalog, and a "definition" stage 1200 (FIG. 12) of the process is displayed to the user that allows the user to define the contents of the mashup container. The user can retrieve a logo that the user wants to display in the composite application using the retrieve logo field 1210, and can enter a Uniform Resource locator (URL) in a field 1220 to link the composite application to a website such that when the logo is selected, the consumer is directed to the specified website.

Figure 13:
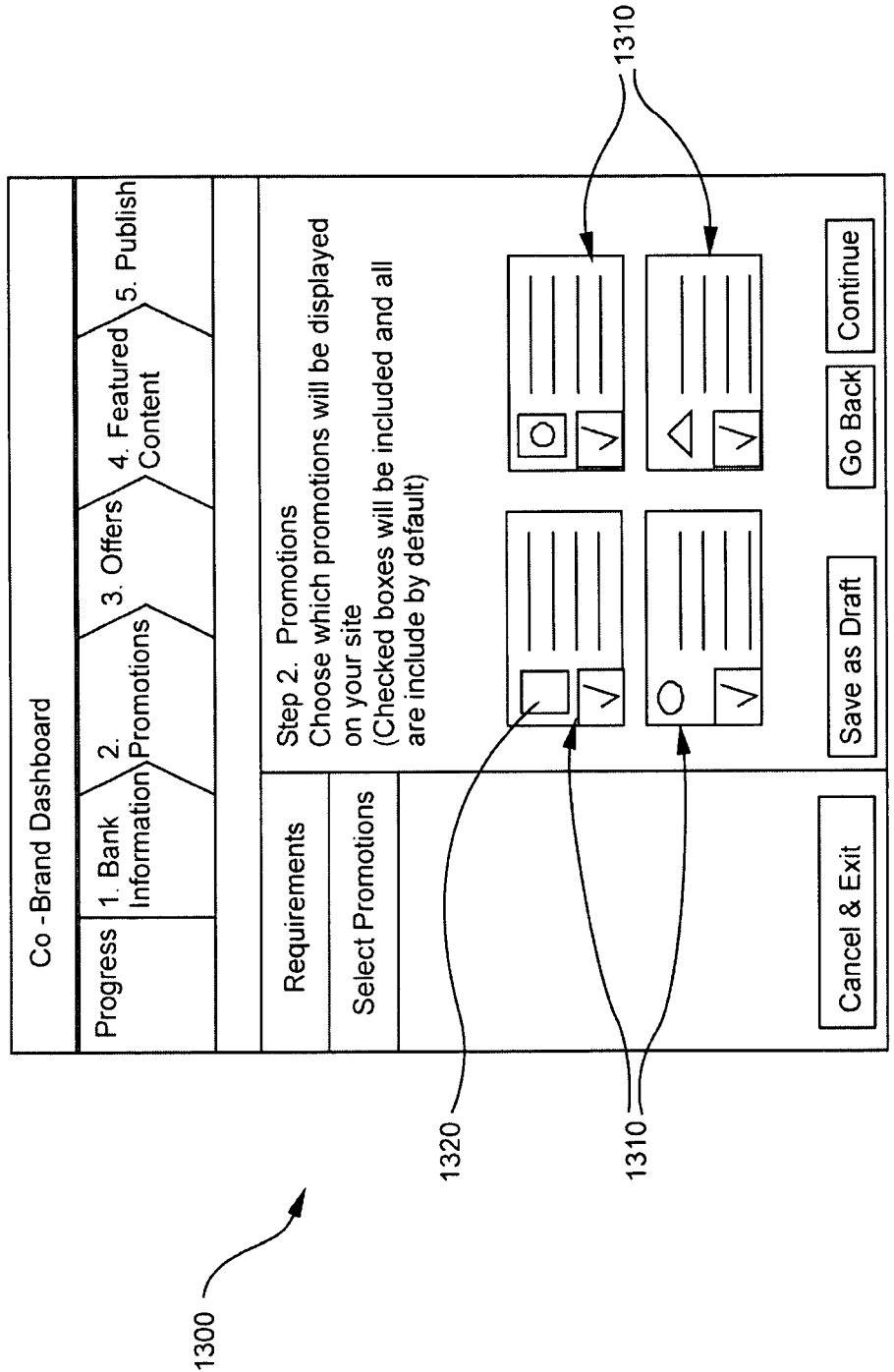
Figure 14:
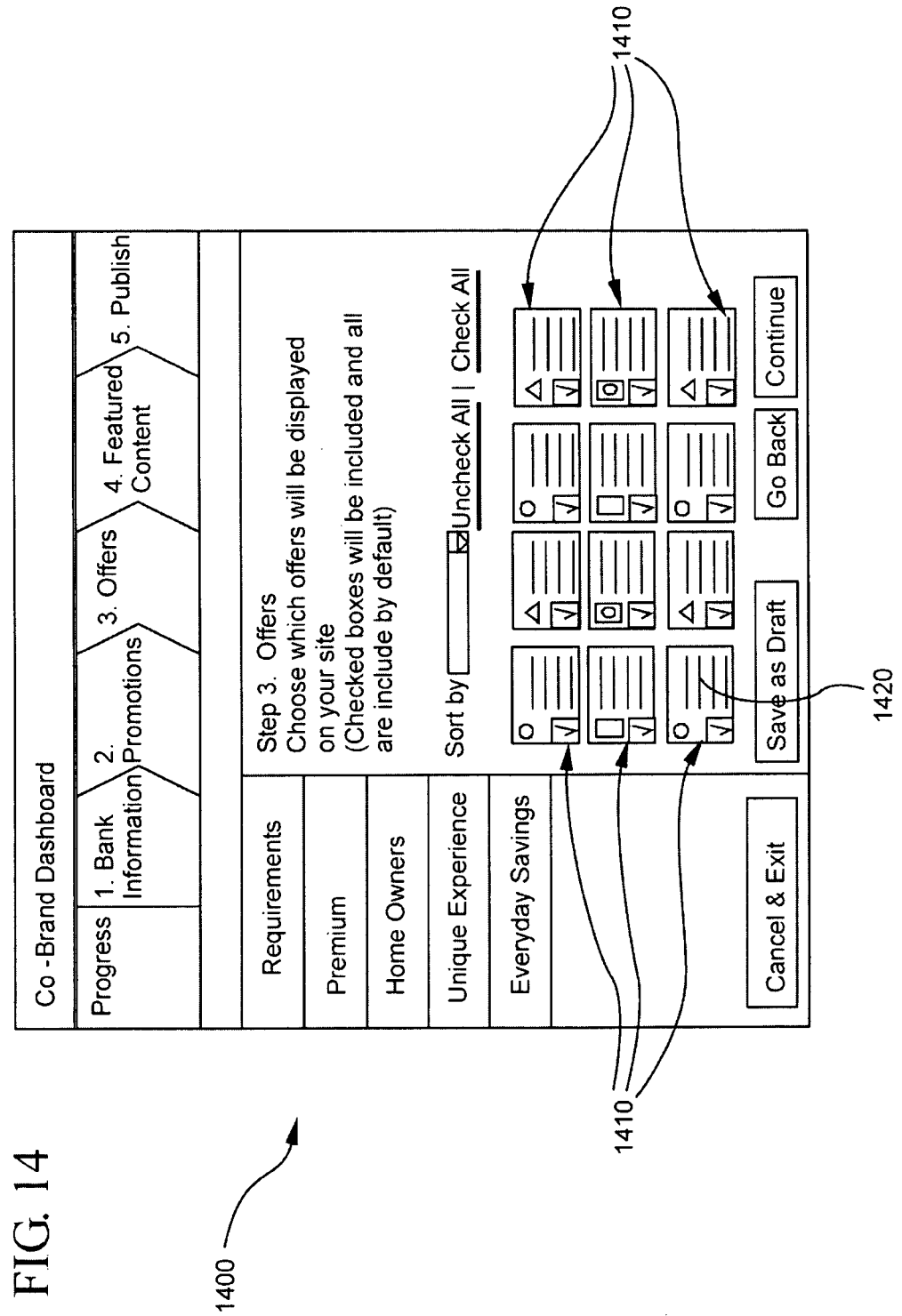
Figure 15:
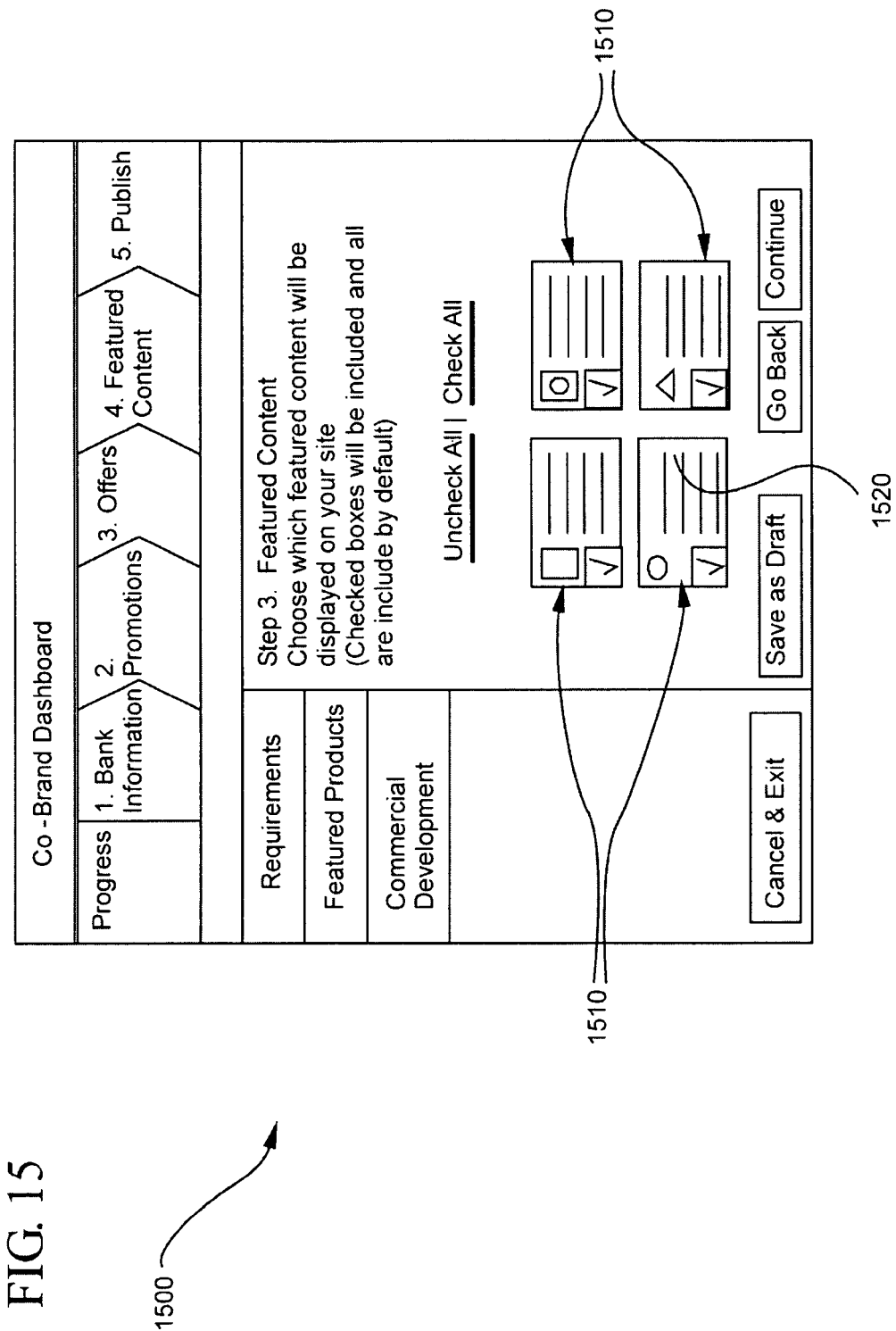

After defining the mashup container contents, the user can complete subsequent stages to add and configure product widgets into their composite application (in this case a "promotions" stage, an "offers" stage, and a "featured content" stage). FIG. 13 shows an exemplary promotions stage 1300, FIG. 14 shows an exemplary offers stage 1400, and FIG. 15 shows an exemplary featured content stage 1500. In all of the stages, the user can select whether to include the product in their composite application or not. If they do select a particular product, the user can configure the details of it, such as which particular promotions or offers they want to display, as well as the layout of the product, presentation skin from the Skin Builder, subcomponents to show or hide, display language, and product-specific behavioral properties. Based on the selections, metadata can be generated that captures the user's selections.

The process performed above, with reference to FIGS. 11-15, creates a composite application for a banking institution and/or merchant, where they specify the products to be incorporated into the composite application. As such, embodiments of the platform 100 allow banking institutions and/or merchants to quickly create websites customized, within the parameters set by a financial institution providing them with the composite application service, to add value to the banking institution's and/or merchant's business. End users accessing the composite application created by the banking institution and/or merchant can select and interact with the products in which they are interested.

Figure 16:
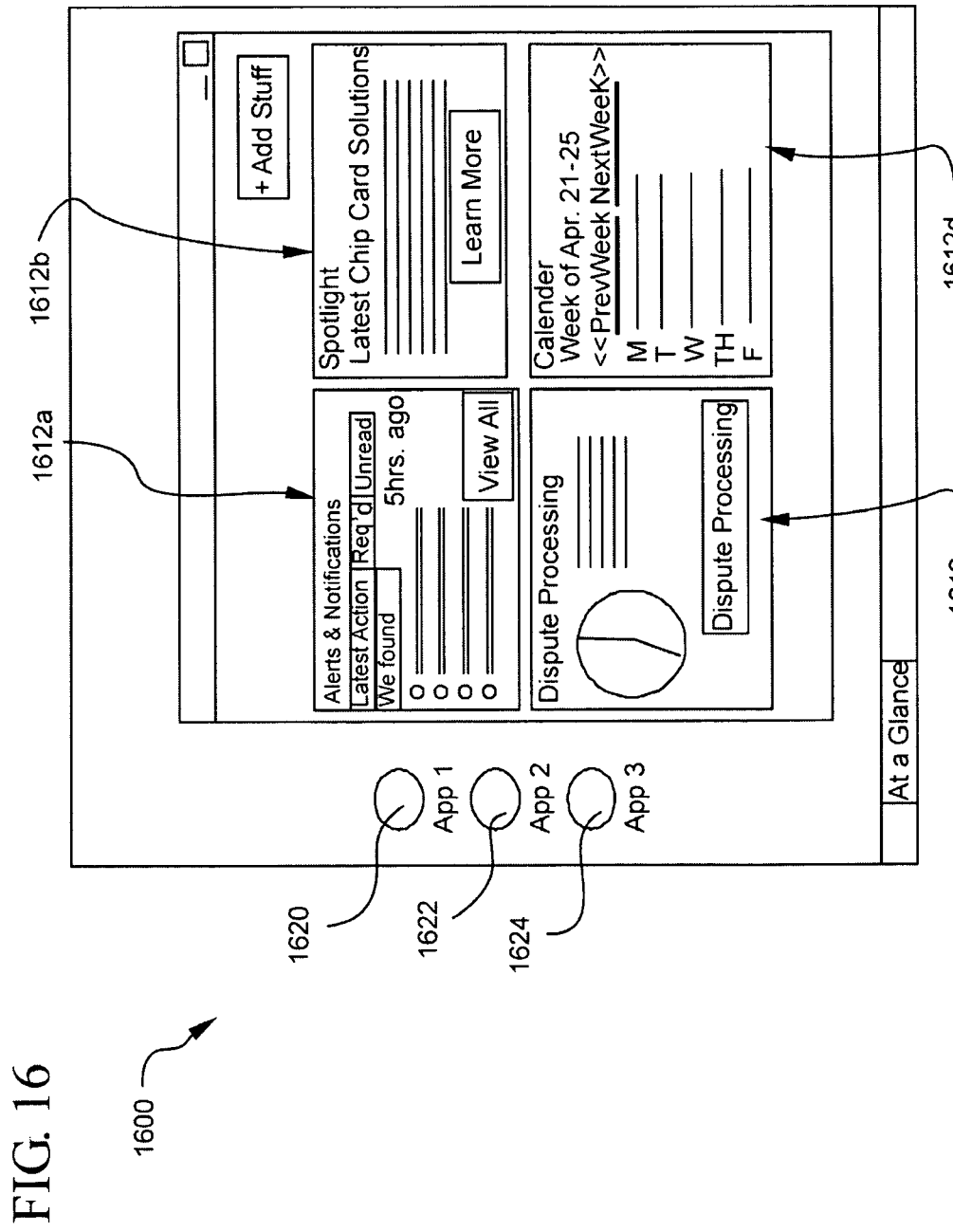
FIGS. 16-17 show an exemplary web desktop that can be implemented in accordance with embodiments of the present invention.

As discussed above, embodiments of the platform 100 can be used to create a web-based composite application that provides a web desktop 1600 to an end user as depicted in FIG. 16. When an end user logs into the web desktop 1600, the web desktop 1600 is configured based on the role of the user, such as business unit or department in which the user works. In this manner, when a user log into the web desktop 1600, widgets associated with the user or the user's role are retrieved and loaded into the web desktop 1600. The layout of the widgets can be determined using layout specification metadata, which can be maintained from a previous long on.

In the present example, a dashboard widget 1610 can be displayed to the user to display information that may be helpful to the user. The dashboard widget 1610 can be displayed in quadrants 1612a-d, where each quadrant can contain a different set of information such as "Alerts and Notifications," "Spotlight," "Dispute Processing," and a "calendar." The quadrants 1612a-d of the dashboard widget 1610 can be customized to summarize information based on the role of the user so that information relevant to the user's work function can be displayed. The dashboard widget is preferably itself a composite widget in that each quadrant panel is itself another widget.

Upon log on, the web desktop 1600 can load icons 1620, 1622, and 1624, which correspond to application widgets that can be accessed by the user. The Composite Application Assembler is responsible for determining the applicable icons based on the user role. The user can select the icons to launch the corresponding widgets within the web desktop for use by the user.

Figure 17:
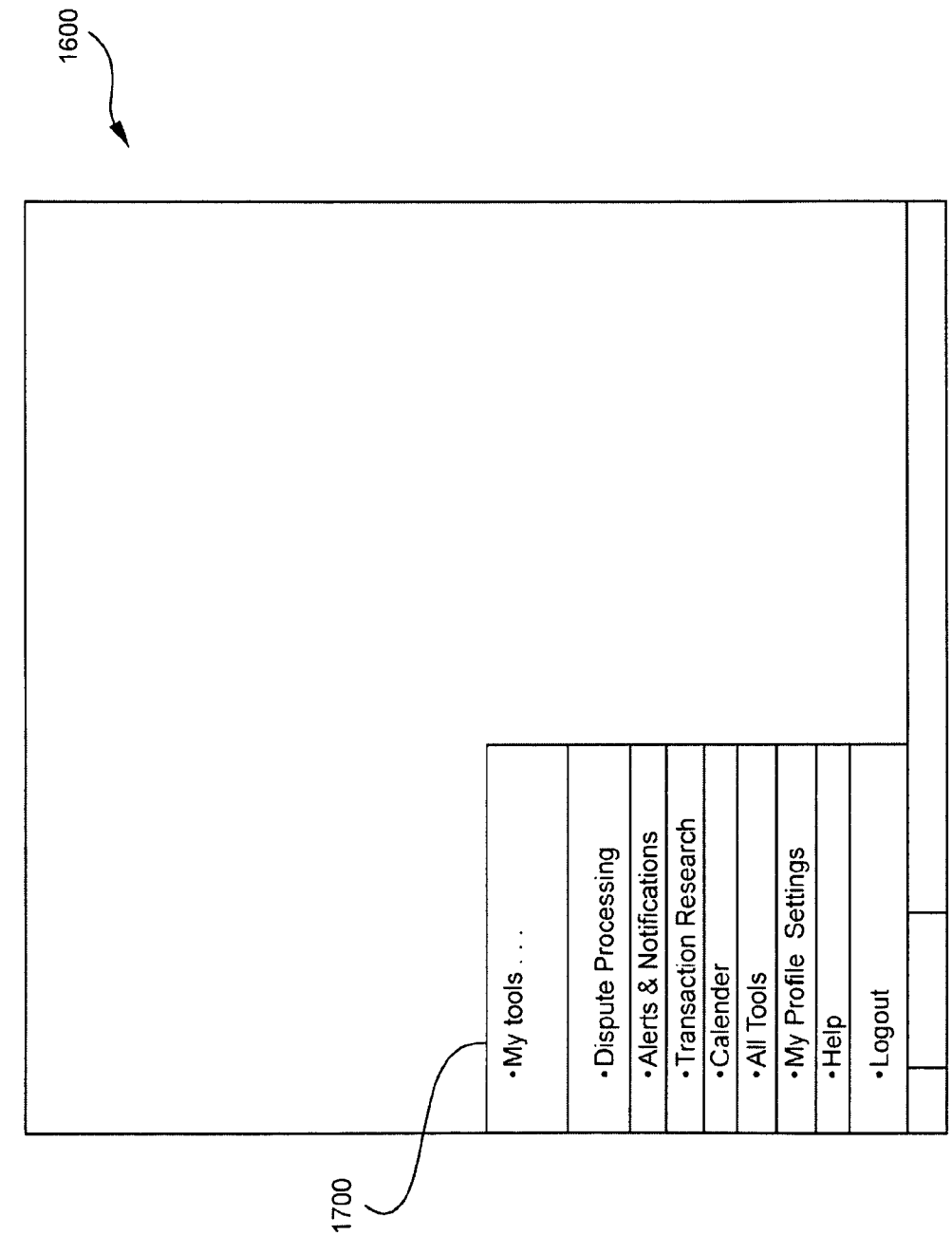

Referring now to FIG. 17, the web desktop 1600 can also include a toolbox menu widget 1700, which upon being selected by the user can display workspace navigation items that can be selected by the user. The available items are populated by the Composite Application Assembler based on the role of the user and corresponding widget metadata. The toolbox provides a common launching point for widgets that when selected are added to the web desktop for use by the user.

Figure 18:
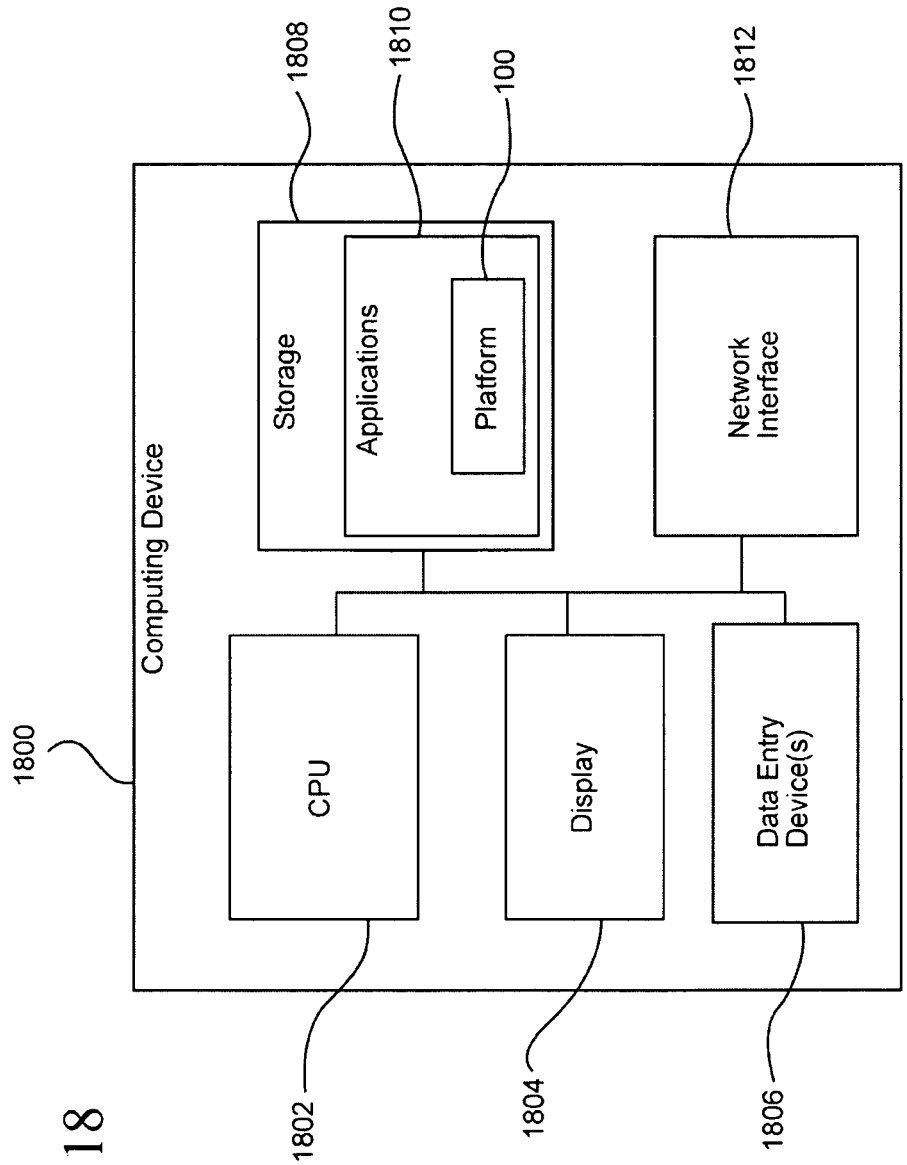
FIG. 18 depicts an exemplary computing device suitable for practicing embodiments of the present invention.

FIG. 18 depicts an exemplary computing device 1800 suitable for practicing the embodiments of the present invention. The computing device 1800 can be a mainframe, personal computer (PC), laptop computer, workstation, handheld device, such as a PDA, a cell phone, or the like. In the illustrated embodiment, the computing device 1800 includes a central processing unit (CPU) 1802 and a display device 1804. The CPU 1802 controls each component of the computing device 1800 to provide components of the platform 100. The display device 1804 enables the computing device 1800 to communicate directly with a user and/or provider through a visual display and can graphically render composite applications. The computing device 1800 can further include data entry device(s) 1806, such as a keyboard, touch screen, mouse, and the like, to allow the user to interact with the platform 100. The computing device 1800 can include storage 1808 for storing data, such as widgets, metadata, layout information, user preferences, and the like. The storage 1808 can include such technologies as a floppy drive, hard drive, tape drive, Flash drive, optical drive, read only memory (ROM), random access memory (RAM), and the like.

Applications 1810, such as the platform 100, or components thereof, can be resident in the storage 1808. The applications can include code known to those skilled in the art that when executed can be used to generate composite applications. The code can be composed of at least one of C, C++, Java, Basic, Perl, assembly language, machine code, and the like. The storage 1808 can be local or remote to the computing device 1800. The computing device 1800 can also include a network interface 1812 for communicating with a network and can be used for a distributed implementation. The CPU 1802 operates to run the applications, such as the platform 100, in storage 1808 by performing instructions therein and storing data resulting from the performed instructions, which may be graphically depicted via the display 1804.

Figure 19:
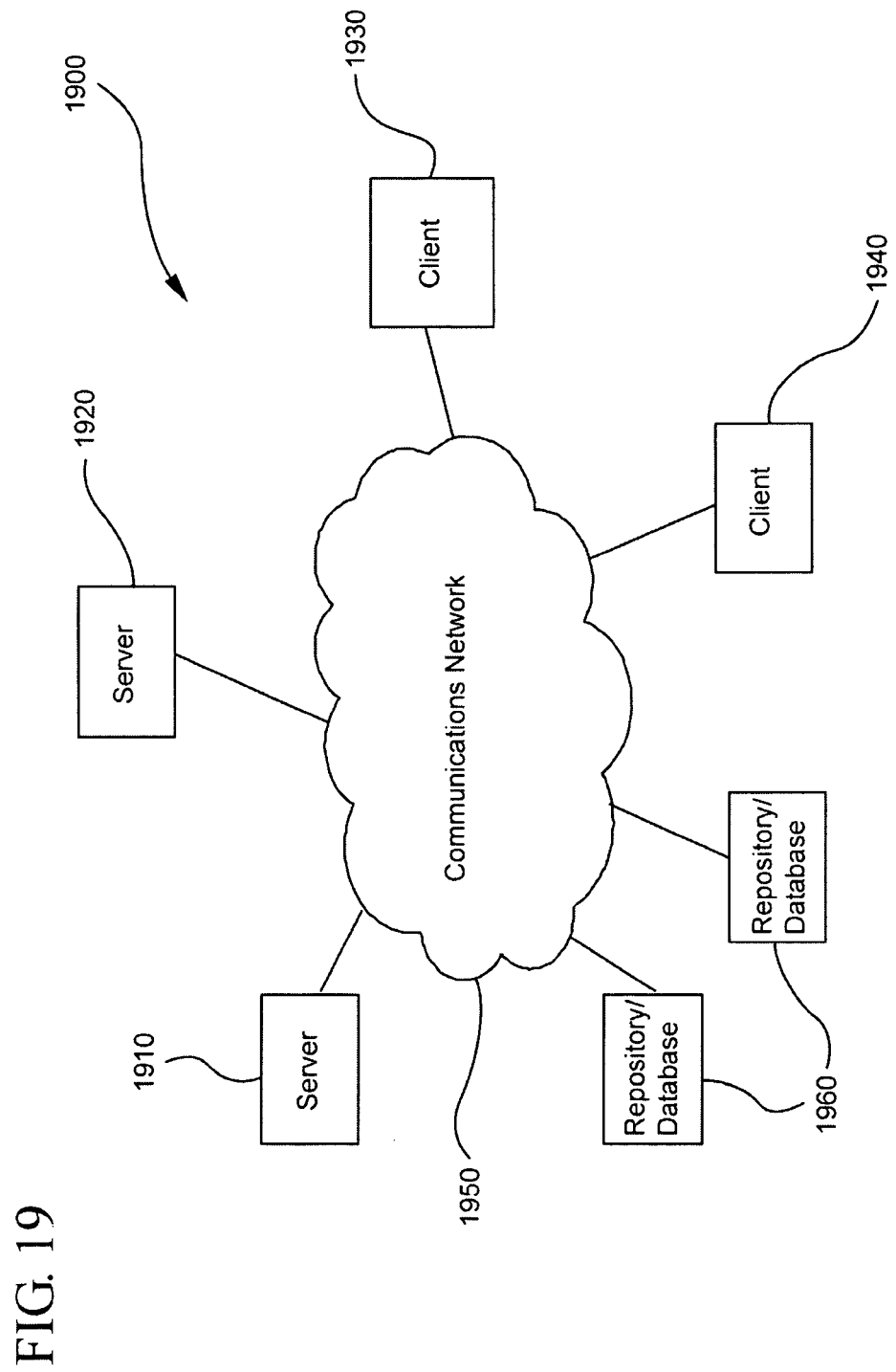
FIG. 19 depicts a distributed system for implementing some embodiments of the present invention.

FIG. 19 depicts a distributed system 1900 for implementing some embodiments of the platform 100. The distributed system 1900 includes one or more servers 1910 and 1920 coupled to clients 1930 and 1940 via a communication network 1950. The servers 1910/1920 and/or the clients 1930/1940 can be implemented using the computing device 1800 of FIG. 18. The distributed system 1900 preferably includes one or more repositories or database 1960, which can be in communication with each other, as well as with the servers 1910 and 1920 and the clients 1930 and 1940, via a communications network 1950.

The servers 1910/1920, clients 1930/1940, and/or databases 1960 can store information, such as components of the platform 100 and/or can store composite application generated using the platform 100. The platform 100 can be distributed among the servers 1910/1920, clients 1930/1940, and databases 1960 such that one or more components of the platform 100 can be located at different device (e.g. clients, servers, databases) in the communication network 1950. For example, the widget catalog can be stored in the database 1960, the mashup container can be implemented by the server 1910, and the client 1930 can receive inputs from a user for creating a composite component on the server using the widget catalog and the mashup container.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method of creating a composite application comprising:
    receiving a selection by a user of a first and a second widget from a widget catalog of a plurality of available widgets associated with one or more products, wherein the first widget is incompatible with the second widget;
    retrieving first and second widgets selected by the user;
    implementing the first and second widgets in a mashup container environment;
    providing a widget event mediator;
    connecting the first widget with the second widget;
    translating events associated with the first widget to a form compatible with the second widget;
    loading the first and second widgets into the mashup container at a runtime;
    defining a behavior of, and an interaction between, the first and second widgets in the mashup container environment using metadata associated with the first and second widgets without requiring software development effort from the user;
    applying domain rules involving interactions between the first widget and the second widget for transfer of the events between the first widget and the second widget so that the first widget is unaffected by the implementation of the second widget in the mashup container environment, the interactions between the first widget and the second widget and their corresponding behavior representing domain rules of the composite application facilitated by the widget event mediator;
    applying a skin to the composite application, the skin controlling a visual presentation of the application on a display;
    building a list of available external destination containers, the first widget capable of being implemented in an external destination container associated with the list;
    receiving a selection from the user of a selected external destination container from the list;
    locating a widget publisher and a correct widget adapter from the metadata associated with the first widget;
    encapsulating the first widget with the located widget adapter; and
    adding the first widget to the selected external destination container using the widget publisher.

2. The method of claim 1 further comprising:
    retrieving layout specification metadata specific to the user, the layout specification metadata corresponding to a layout of the first and second widgets;
    loading the first and second widgets into the mashup container environment at a runtime, based on a role of the user;
    interpreting the layout specification metadata at the runtime, when the first and second widgets are being loaded into the mashup container environment; and
    depicting, graphically, the first and second widgets respectively at a position according to the associated layout specification metadata.

3. The method of claim 1 further comprising
    querying the first widget representing a data producer for a type of data being exchanged;
    building a list of active widgets from the first and second widgets in the mashup container environment;
    retrieving the widget metadata from the widget catalog for the active widgets;
    determining whether the widgets from the list of active widgets are data consumers of the type of data being exchanged by the data producer;
    adding the widgets determined to be data consumers of the type of data being exchanged to a list of possible actions; and
    displaying the list of possible action to the user.

4. The method of claim 1 further comprising
    operating the first or second widgets that are dependent on a first service provider interface (SPI) of the mashup container environment within a third party container having a second service provider interface; and
    providing an adapter that converts between the first SPI of the mashup container environment and the second SPI of the third party container.

5. The method of claim 1 further comprising:
    retrieving layout specification or configuration metadata associated with a position at which the first and second widgets are to be depicted on the display;
    depicting, graphically, the first and second widgets respectively at the position according to the associated layout specification or configuration metadata; and
    interpreting the layout specification metadata at the runtime when the first and second widgets are being loaded into the mashup container environment.

6. A non-transitory computer-readable medium comprising instructions, wherein execution of the instructions by at least one computing device facilitates creating a composite application by:
    receiving a selection by a user of a first and a second widget from a widget catalog of a plurality of available widgets associated with one or more products, wherein the first widget is incompatible with the second widget;
    retrieving the first and second widgets selected by the user;
    implementing the first and second widgets in a mashup container environment;
    providing a widget event mediator;
    connecting the first widget with the second widget;
    translating events associated with the first widget to a form compatible with the second widget;
    loading the first and second widgets into the mashup container environment at a runtime;
    defining a behavior of, and an interaction between, the first and second widgets in the mashup container using metadata associated with the first and second widgets without requiring software development effort from the user;
    applying domain rules involving interactions between the first widget and the second widget for transfer of the events between the first widget and the second widget so that the first widget is unaffected by the implementation of the second widget in the mashup container environment, the interactions between the first widget and the second widget and their corresponding behavior representing domain rules of the composite application facilitated by the widget event mediator;
    applying a skin to the composite application, the skin controlling a visual presentation of the application on a display;
    building a list of available external destination containers, the first widget capable of being implemented in an external destination container associated with the list;
    receiving a selection from the user of a selected external destination container from the list;

locating a widget publisher and a correct widget adapter from the metadata associated with the first widget;

encapsulating the first widget with the located widget adapter; and adding the first widget to the selected external destination container using the widget publisher.

7. The non-transitory computer-readable medium of claim 6, wherein execution of the instructions by the at least one computing device further facilitates creating a composite application by:

retrieving layout specification metadata specific to the user, the layout specification metadata corresponding to a layout of the first and second widgets;

loading the widgets into the mashup container environment at a runtime based on a role of the user;

interpreting the layout specification metadata at the runtime, when the first and second widgets are being loaded into the mashup container environment; and depicting, graphically, the first and second widgets respectively at a position according to the associated layout specification metadata.

8. The non-transitory computer-readable medium of claim 6, wherein execution of the instructions by the at least one computing device further facilitates creating a composite application by:

querying the first widget representing a data producer for a type of data being exchanged;

building a list of active widgets from the first and second widgets in the mashup container environment;

retrieving the widget metadata from the widget catalog for the active widgets;

determining whether the widgets from the list of active widgets are data consumers of the type of data being exchanged by the data producer;

adding the widgets determined to be data consumers of the type of data being exchanged to a list of possible actions; and displaying the list of possible action to the user.

9. The non-transitory computer-readable medium of claim 6, wherein execution of the instructions by the at least one computing device further facilitates creating a composite application by:

operating the first and second widgets that are dependent on a first service provider interface (SPI) of the mashup container environment within a third party container having a second service provider interface; and providing an adapter that converts between the first SPI of the mashup container environment and the second SPI of the third party container.

10. The non-transitory computer-readable medium of claim 6, wherein execution of the instructions by at least one computing device further facilitates creating a composite application by:

retrieving layout specification or configuration metadata associated with a position at which the first and second widgets are to be depicted on the display;

depicting, graphically, the first and second widgets respectively at the position according to the associated layout specification or configuration metadata; and interpreting the layout specification metadata at the runtime when the first and second widgets are being loaded into the mashup container environment.

11. A system for creating a composite application comprising:

at least one computing device having a processor; and a non-transitory computer-readable medium comprising instructions, wherein execution of the instructions by the at least one computing device facilitates creating a composite application by causing the computing device to provide a mashup container environment, in which a first widget and a second widget respectively associated with one or more products are implemented based on a selection by a user of the first and second widgets from a widget catalog, wherein the first widget is incompatible with the second widget, the mashup container environment facilitating a definition of a behavior of, and an interaction between, the first and second widgets using metadata associated with the widgets without requiring software development effort from the user;

provide a widget event mediator, the interactions between the first widget and the second widget and their corresponding behavior representing domain rules of the composite application facilitated by the widget event mediator;

facilitate applying a skin to the composite application, the skin controlling a visual presentation of the composite application on a display;

build a list of available external destination containers, the first widget capable of being implemented in an external destination container associated with the list;

provide a composite application assembler configured to load the first and second widgets into the mashup container environment at a runtime;

provide a widget data exchange configured to query the first widget representing a data producer for a type of data being exchanged, to build a list of active widgets from the first and second widgets in the mashup container environment, to retrieve the widget metadata for the active widgets from the widget catalog, to determine whether the widgets from the list of active widgets are data consumers of the type of data being exchanged by the data producer, to add the widgets determined to be data consumers of the type of data being exchanged to a list of possible actions, and to display the list of possible action to the user; and the widget event mediator configured to connect the first widget with the second widget, to translate events associated with the first widget to a form compatible with the second widget, and to apply domain rules involving interactions between the first widget and the second widget for transfer of the events between the first widget and the second widget so that the first widget is unaffected by the presence of the second widget in the mashup container environment.

12. The system of claim 11, wherein execution of the instructions by the at least one computing device further facilitates creating a composite application by causing the computing device to provide:

a layout generator configured to retrieve layout specification metadata corresponding to a layout of the first and second widgets that is specific to the user, interpret the layout specification metadata at a runtime when first and second widgets are being loaded into the mashup container environment, and to depict, graphically, the first and second widgets respectively at the position according to the layout specification metadata; and a composite application assembler configured to load the first and second widgets into the mashup container environment at the runtime based on a role of the user.

13. The system of claim 11, wherein execution of the instructions by the at least one computing device further facilitates creating a composite application by causing the computing device to provide:

a widget adapter configured to operate the first or second widgets that are dependent on a first service provider interface (SPI) of the mashup container environment within a third party container having a second SPI, and to provide an adapter that converts between the first SPI of the mashup container environment and the second SPI of the third party container.

14. The system of claim 11, wherein execution of the instructions by the at least one computing device further facilitates creating a composite application by causing the computing device to:

provide a layout generator configured to retrieve, from a configuration repository, configuration or layout specification metadata associated with a position at which first and second of the widgets are to be depicted on the display; and interpret the configuration or layout specification metadata at the runtime when widgets are being loaded into the mashup container environment, and to graphically depict the first and second widgets at the respective position according to the associated configuration or layout specification metadata.

\* \* \* \* \*